US012229894B2

(12) United States Patent
Madden et al.

(10) Patent No.: US 12,229,894 B2
(45) Date of Patent: Feb. 18, 2025

(54) EXTENDED REALITY 3D SPACE CREATION AND MANAGEMENT

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 141 days.

(21) Appl. No.: 18/081,963

(22) Filed: Dec. 15, 2022

(65) Prior Publication Data

US 2023/0196681 A1    Jun. 22, 2023

Related U.S. Application Data

(60) Provisional application No. 63/290,763, filed on Dec. 17, 2021.

(51) Int. Cl.
*G06T 19/00*      (2011.01)
*G06F 3/01*       (2006.01)
(Continued)

(52) U.S. Cl.
CPC .............. *G06T 19/00* (2013.01); *G06F 3/011* (2013.01); *G06T 7/20* (2013.01); *G06T 7/70* (2017.01); *G06T 2207/30232* (2013.01)

(58) Field of Classification Search
CPC .. G06T 19/00; G06T 7/20; G06T 7/70; G06T 2207/30232; G06T 2210/21; G06T 19/20;
(Continued)

(56) References Cited

U.S. PATENT DOCUMENTS 6,257,085 B1    7/2001  Bokamper et al.
10,022,873 B2   7/2018  Larrea-Tamayo et al.
(Continued)

OTHER PUBLICATIONS

PCT Invitation to Pay Additional Fees in International Appln. No. PCT/US2022/081625, mailed on Mar. 2, 2023, 2 pages.
(Continued)

*Primary Examiner* — Jitesh Patel
(74) *Attorney, Agent, or Firm* — Fish & Richardson P.C.

(57) ABSTRACT

Methods, systems, and apparatus, including computer programs encoded on computer storage media, for monitoring extended reality spaces. One of the methods includes selecting, from a physical space at a property, a first available portion of the physical space for representing an extended reality environment; causing presentation of a first portion of the extended reality environment at the first available portion of the physical space; predicting, using sensor data generated from one or more sensors at the property, that the first available portion of the physical space will likely be interfered with; in response to predicting that the first available portion of the physical space will likely be interfered with, selecting, from the plurality of available portions of the physical space, a second available portion for representing the environment; and causing presentation of a second portion of the extended reality environment at the second available portion of the physical space.

20 Claims, 7 Drawing Sheets

(51) Int. Cl.
*G06T 7/20* (2017.01)
*G06T 7/70* (2017.01)

(58) Field of Classification Search
CPC ..... G06T 2219/2004; G06T 2219/2016; G06T 19/006; G06F 3/011; G06F 3/167; A47L 2201/04; A47L 11/4011; G08B 21/02
See application file for complete search history.

(56) References Cited

U.S. PATENT DOCUMENTS

| | | | |
|---|---|---|---|
| 10,378,200 | B2 | 8/2019 | Larrea-Tamayo et al. |
| 10,502,295 | B2 | 12/2019 | Kollreider |
| 10,981,060 | B1* | 4/2021 | Muskin ................. A63F 13/25 |
| 11,305,416 | B1 | 4/2022 | Correnti et al. |
| 2010/0327717 | A1 | 12/2010 | Huber et al. |
| 2011/0062842 | A1 | 3/2011 | Huber et al. |
| 2017/0113683 | A1* | 4/2017 | Mudalige .......... B60W 30/0956 |
| 2019/0033989 | A1 | 1/2019 | Wang et al. |
| 2019/0043259 | A1* | 2/2019 | Wang ...................... G06F 3/012 |
| 2019/0046873 | A1 | 2/2019 | Black |
| 2019/0083880 | A1 | 3/2019 | Kim |
| 2019/0340909 | A1 | 11/2019 | Nguyen et al. |
| 2020/0258278 | A1* | 8/2020 | Mirhosseini ............ G06T 7/292 |
| 2020/0294311 | A1* | 9/2020 | Holz .................... H04N 13/271 |
| 2021/0201584 | A1 | 7/2021 | Ha et al. |
| 2021/0270620 | A1 | 9/2021 | Nepomuceno et al. |
| 2021/0382547 | A1 | 12/2021 | Johnson et al. |
| 2022/0139042 | A1* | 5/2022 | Whitman ................ G06F 3/011 345/419 |
| 2023/0092395 | A1 | 3/2023 | Madden |
| 2023/0360074 | A1* | 11/2023 | Cho ....................... G06Q 30/02 |

OTHER PUBLICATIONS

PCT International Search Report and Written Opinion in International Appln. No. PCT/US2022/081625, mailed on Jun. 15, 2023, 27 pages.

* cited by examiner

EXTENDED REALITY 3D SPACE CREATION AND MANAGEMENT

CROSS-REFERENCE TO RELATED APPLICATION

This application claims the benefit of U.S. Provisional Application No. 63/290,763, filed Dec. 17, 2021, the contents of which are incorporated by reference herein.

TECHNICAL FIELD

This specification relates generally to objects and augmented and virtual reality computer systems.

BACKGROUND

Augmented reality (AR) is an interactive experience of a real-world environment where the objects that reside in the real world are augmented by computer-generated perceptual information, sometimes across multiple sensory modalities, such as visual, auditory, haptic, somatosensory, and olfactory.

Virtual reality (VR) is a simulated experience that can be similar to or completely different from the real world. Applications of virtual reality include, but are not limited to, entertainment (e.g. video games), education (e.g. medical or military training), and business (e.g. virtual meetings).

Virtual and augmented reality can be referred to generally as extended reality (XR).

SUMMARY

Disclosed are systems and methods for extended reality (XR) three-dimensional (3D) space management. The disclosed techniques can be used for XR 3D space monitoring, dynamic 3D space management, and coordination of multiple 3D spaces.

XR provides an enhanced or alternate version of reality where a view of physical real-world environments as seen through a computing device is augmented with superimposed, computer-generated images, thus enhancing the user's view, or replaced with computer-generated images. The computing device can provide a computer-generated simulation of a three-dimensional image or environment that can be interacted with in a seemingly real or physical way by a person using special electronic equipment, such as a helmet with a screen inside or gloves fitted with sensors. In the case of augmented reality, graphics, sounds, and touch feedback can be added into the view on the computing device to create an enhanced user experience.

XR devices often require a 3D space, e.g., an area free of obstructions where a user can move about within the virtual or augmented world without bumping into objects in the real world while the user is wearing a headset. In some cases, the 3D space is part of a dedicated space such as an XR arena. In some cases, the 3D space is part of a property such as a house or apartment. The property may be shared with other residents and occupants. The property may also be shared with other users of XR devices. In some cases, an obstruction may be introduced to a previously unobstructed 3D space while the user is wearing the headset. For example, a person or animal may enter the 3D space while the user is wearing the headset in the 3D space. The person or animal might also leave an object in the 3D space, creating a new obstruction.

In an example scenario, the user may don an XR headset in an unobstructed 3D space in a living room of a house. Another resident may return home from work, enter the 3D space, and put their briefcase down on the floor in the 3D space. The resident crossing through the 3D space, and the briefcase placed on the floor in the 3D space, are obstructions in the 3D space.

The disclosed systems and techniques can be used to prevent the user from colliding with, tripping over, or otherwise unintentionally interacting with a person, animal, or object that is unexpectedly in the 3D space. The disclosed systems and techniques can also be used to prevent a person from entering the 3D space and/or leaving an object in the 3D space.

The system can generate and maintain a 3D model of the 3D space. The model can include representations of irregular geometry, multilevel floors, overhangs, and other abnormal features of a space. The 3D space can span multiple rooms in a property, including passing through hallways and doorways.

The system can use sensors such as door position sensors, cameras, PIR sensors, and other types of sensors to predict and detect obstructions and interferences within a 3D space. The system can also dynamically adjust the 3D space based on detected objects and events. When the 3D space is adjusted, the XR application that is in progress can reconfigure its virtual spaces to fit the constraints of the real-world adjusted 3D space.

In some examples, multiple XR device users can participate in different XR experiences in the same area. The disclosed systems and techniques can be used to prevent the multiple users from colliding with each other, while minimizing disruption to the XR experience of each user. The system can track all users in the play space, and negotiate 3D space between the various independent XR applications. This enables each XR application to increase use of the full 3D space, while maintaining users at a safe distance from each other.

In general, one innovative aspect of the subject matter described in this specification can be embodied in methods that include the actions of maintaining, for an extended reality environment generated by a first device operated by a person, data defining a three-dimensional space at a property; accessing sensor data generated by one or more sensors physically located at the property; predicting, using the sensor data, that an object will likely interfere with the three-dimensional space at the property; and in response to predicting that the object will likely interfere with the three-dimensional space at the property, providing a notification to a second device.

In general, one innovative aspect of the subject matter described in this specification can be embodied in methods that include the actions of selecting, from a plurality of available portions of a physical space at a property, a first available portion of the physical space for representing an extended reality environment; causing, using the first available portion of the physical space, presentation of a first portion of the extended reality environment at the first available portion of the physical space; predicting, using sensor data generated from one or more sensors at the property, that the first available portion of the physical space will likely be interfered with; in response to predicting that the first available portion of the physical space will likely be interfered with, selecting, from the plurality of available portions of the physical space, a second available portion for representing the extended reality environment; and causing, using the second available portion of the physical space, presentation of a second portion of the extended reality environment at the second available portion of the physical space.

In general, one innovative aspect of the subject matter described in this specification can be embodied in methods that include the actions of determining, for a first extended reality environment generated by a first device, first data defining a first three-dimensional space at a property for the first extended reality environment; determining, for a second extended reality environment generated by a second device, second data defining a second three-dimensional space at the property for the second extended reality environment; determining whether the first three-dimensional space at least partially overlaps with the second three-dimensional space; in response to determining that the first three-dimensional space at least partially overlaps with the second three-dimensional space, determining that the first three-dimensional space has a higher priority than the second three-dimensional space; in response to determining that the first three-dimensional space has the higher priority than the second three-dimensional space, providing, to the second device, a command to cause the second device to adjust an experience for the second extended reality environment.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the method includes determining that the person is likely experiencing the extended reality environment with the first device, wherein: providing the notification to the second device is responsive to determining that the person is likely experiencing the extended reality environment with the first device.

In some implementations, the method includes predicting, using the sensor data, that another object will likely interfere with the three-dimensional space at the property; determining that the person likely is not experiencing the extended reality environment with the first device; and in response to predicting that the other object will likely interfere with the three-dimensional space at the property and that the person likely is not experiencing the extended reality environment with the first device, determining to skip providing another notification.

In some implementations, the method includes determining that the person likely is not experiencing the extended reality environment includes determining that the extended reality environment is paused or has ended.

In some implementations, the method includes determining, using the sensor data, the second device to which to provide the notification.

In some implementations, the method includes an object which includes another person; and determining the second device includes: determining, using the sensor data, a likely identifier for the other person; and determining, using the likely identifier for the other person, the second device for the other person.

In some implementations, the method includes providing the notification which includes providing the notification to an autonomous device to cause the autonomous device to reduce a likelihood of the object interfering with the three-dimensional space at the property.

In some implementations, the method includes an object includes the autonomous device.

In some implementations, the method includes providing the notification which includes providing the notification to the first device.

In some implementations, the method includes providing the notification which includes providing, to the first device, a command to cause the first device to generate a representation of the object in the extended reality environment.

In some implementations, the method includes providing the notification which includes providing, to the first device, a command to cause the first device to pause the extended reality environment.

In some implementations, the method includes providing the notification which includes providing a command to a speaker to cause the speaker to present an audible notification about the potential interference of the object with the three-dimensional space for the extended reality environment.

In some implementations, the method includes providing the notification which includes providing a command to the second device to cause the second device to present, at the property, an identifier for at least a portion of a boundary of the three-dimensional space for the extended reality environment.

In some implementations, the method includes a physical space which includes a three-dimensional space available for use for the extended reality environment.

In some implementations, the method includes determining, for at least one physical portion of the physical space, whether the respective portion is likely occupied; and using, as the plurality of available portions of physical space, one or more of the physical portions of the physical space that is not likely occupied.

In some implementations, the method includes determining, for at least one physical portion of the physical space, whether the respective portion is likely occupied; and using, as the plurality of available portions of physical space, one or more of the physical portions of the physical space that is not likely occupied.

In some implementations, the method includes determining, for at least one physical portion of the physical space, a status of a device physically located within a threshold distance of the respective physical portion; and selecting, using the status of the at least one device physically located within the threshold distance of the respective physical portion, one or more of the physical portions of the physical space as the plurality of available portions of physical space.

In some implementations, the method includes for each of one or more physical portions of the physical space: determining a likelihood that the respective portion will be interfered with during an expected duration for an extended reality environment session; and determining whether the likelihood satisfies a likelihood threshold; and using, as the plurality of available portions of physical space, the physical portions of the physical space that have a corresponding likelihood that satisfies the likelihood threshold.

In some implementations, the method includes predicting that the first available portion of the physical space will likely be interfered with which includes predicted, using the sensor data generated from one or more sensors at the property, that an object will likely enter the first available portion of the physical space.

In some implementations, the method includes predicting that the first available portion of the physical space will likely be interfered with which includes predicted, using a current time at the property, the first available portion of the physical space will likely be interfered with.

In some implementations, the method includes the second available portion is a proper subset of the area included in the first available portion.

In some implementations, the method includes causing presentation of the portion of the extended reality environment at the available portion of the physical space which includes sending, to a device that generates the extended reality environment, a command to cause the device to present the portion of the extended reality environment at the available portion of the physical space.

In some implementations, the method includes providing the command which includes providing the command to cause the second device to pause the second extended reality environment.

In some implementations, the method includes providing the command which includes providing the command to cause the second device to delay presentation of at least some content for the second extended reality environment.

In some implementations, the method includes providing the command which includes: in response to determining that the first three-dimensional space has the higher priority than the second three-dimensional space, determining a third three-dimensional space at the property for the second extended reality environment that does not overlap with the first three-dimensional space, providing the command to cause the second device to present the second extended reality environment using the third three-dimensional space instead of the second three-dimensional space.

In some implementations, the method includes providing the command which includes providing, to the second device, the command that causes the second device to transition, over a time period, from a presentation of the second extended reality environment using the second three-dimensional space to the presentation of the second extended reality environment using the third three-dimensional space.

In some implementations, the method includes determining the first data defining the first three-dimensional space at the property for the first extended reality environment which includes detecting a change in a three-dimensional space for the first extended reality environment from a fourth three-dimensional space at the property to the first three-dimensional space; and determining whether the first three-dimensional space at least partially overlaps with the second three-dimensional space is responsive to detecting the change in a three-dimensional space for the first extended reality environment from a fourth three-dimensional space at the property to the first three-dimensional space.

In some implementations, the method includes determining that the first three-dimensional space has the higher priority than the second three-dimensional space uses at least one of a priority for a user of one of the devices, a priority for one of the devices, or a priority for an application generating one of the extended reality environments.

In some implementations, the method includes determining that the first three-dimensional space has the higher priority than the second three-dimensional space uses a duration of an activity for the first extended reality environment.

In some implementations, the method includes determining that the first three-dimensional space has the higher priority than the second three-dimensional space which includes: determining one or more first features for the first extended reality environment; determining one or more second features for the second extended reality environment; determining that a first physical object in the first three-dimensional space satisfies a similarity threshold for at least one of the one or more first features; determining that a second physical object in the second three-dimensional space does not satisfy the similarity threshold for any of the one or more second features; and in response to determining that the first physical object in the first three-dimensional space satisfies the similarity threshold for at least one of the one or more first features and determining that the second physical object in the second three-dimensional space does not satisfy the similarity threshold for any of the one or more second features, determining that the first three-dimensional space has the higher priority than the second three-dimensional space. The subject matter described in this specification can be implemented in various implementations and may result in one or more of the following advantages. The subject matter can provide a smoother, safer XR experience for users, improve safety for the families and roommates of XR users, allow for multiple XR users to share limited physical space, assist with communication between XR users and non-XR users. Other advantages include enabling XR to be used in environments where one may not be able to setup a dedicated space.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
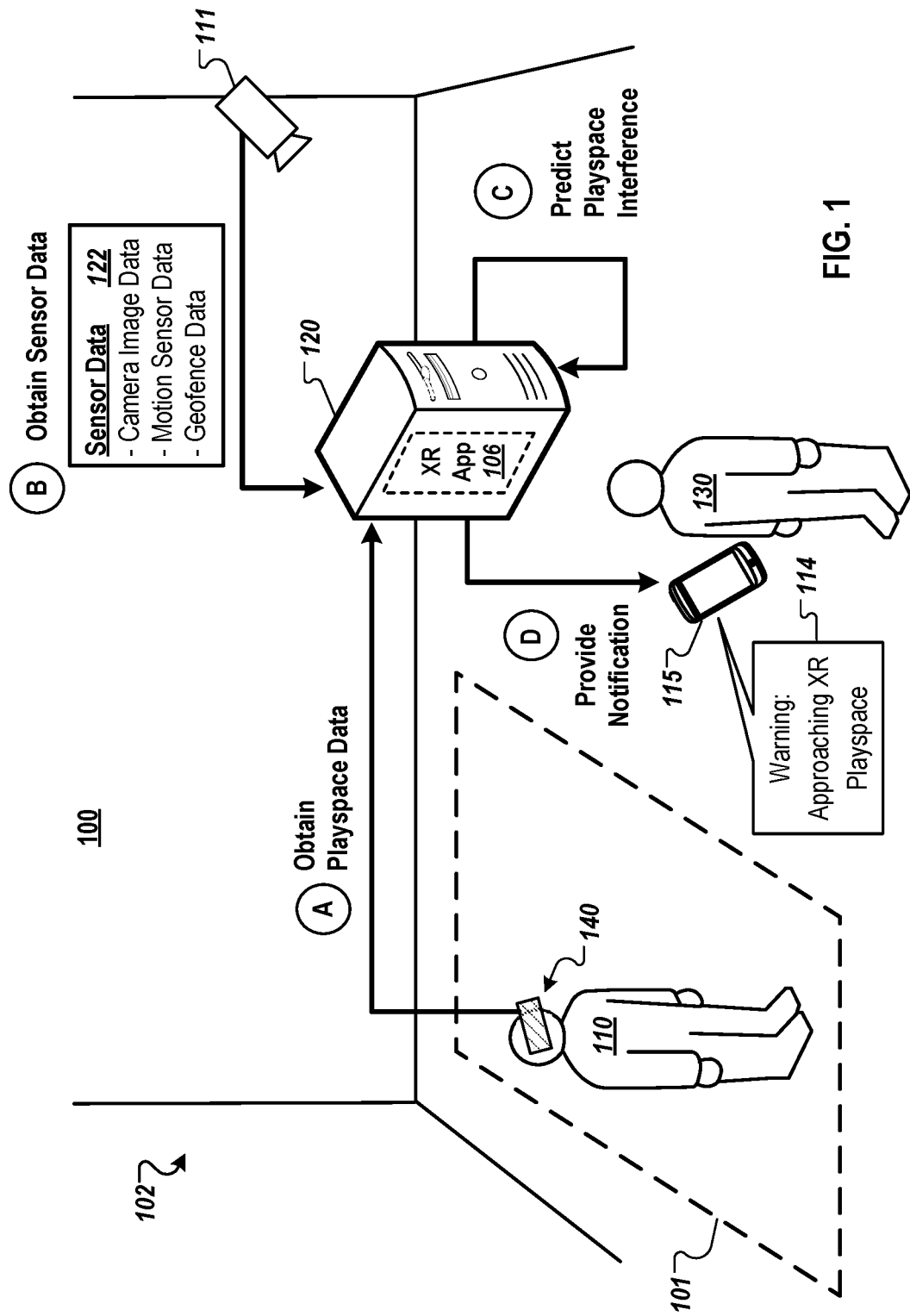
FIG. 1 is a diagram illustrating an example of a system for monitoring XR 3D spaces.

FIG. 1 is a diagram illustrating an example of a environment 100 for monitoring XR 3D spaces. The environment 100 includes a 3D space 101. The environment 100 also includes a system 120, and an XR device 140. The XR device 140 can include a headset worn by the user 110. The system 120 runs an XR application 106. XR environments generated by the XR application 106 are provided to the XR device 140 for presentation to a user 110.

In the example of FIG. 1, the XR device 140 includes the XR device 140 and the system 120. The XR device 140 includes a headset worn by the user 110. The XR device 140 can also include one or more controllers and/or trackers that are worn by or carried by the user 110.

In some examples, an XR device 140 can include a wearable computing system that performs the functions that are described herein as being performed by the system 120. For example, the computing system can be integrated with the headset, e.g., as part of the same physical device as the headset. In some examples, the XR device 140 includes a headset and a separate wearable computing system that performs the functions of the system 120. For example, the XR device 140 can include a wearable computing system that is integrated with a backpack, vest, harness, and/or other garment or accessory.

In some examples, an XR device 140 can include a computing system that is wired or wirelessly communicable with the headset and performs the functions that are described herein as being performed by the system 120. For example, the XR device 140 can include a mobile computing device such as a smart phone, table, laptop, or other mobile computing device. The mobile computing device can run an XR application 106 and transmit images of the XR environments for display on the headset.

In some examples, an XR device 140 can include more than one display. For example, the XR device 140 can include more than one headset, and the system 120 can provide XR environments for display on each of the one or more headsets. In some examples, the XR device 140 can include one or more display screens such as a television screen or computer screen, and the system 120 can provide XR environments for display on the one or more display screens.

The system 120 may be located within or outside of the 3D space 101. The system 120 is in communication with the XR device 140. The system 120 may be, for instance, one or more computer systems, server systems, or other computing devices. In some examples, the system 120 may be a cloud computing platform or a game console. The system 120 can store a model of the 3D space 101. For example, the system 120 can store data indicating boundaries of the 3D space. Boundaries of the 3D space can be physical boundaries, e.g., walls, or can be virtual boundaries input by the user 110.

The 3D space 101 can be any space in which a user 110 uses an XR device 140. For example, the 3D space 101 can be a room of a building or an outdoor area. The 3D space 101 can be a mostly empty space where the user 110 can freely move about without tripping over hazards or bumping into objects in the real world.

Components of the environment 100 can communicate through a network. The network may be any communication infrastructure that supports the electronic exchange of data between the device sand the sensors. The network may include a local area network (LAN), a wide area network (WAN), the Internet, or other network topology. The network may be any one or combination of wireless or wired networks and may include any one or more of Ethernet, cellular telephony, Bluetooth, and Wi-Fi technologies. Communications through the network may be implemented through any one or combination of various protocols, including the 802.11 family of protocols, Bluetooth, Bluetooth LE, Z-Wave, ZigBee, GSM, 3G, 4G, 5G, LTE, or other custom or standard communication protocol. In some examples, the network may include optical data links. To support communications through the network, the components, e.g., the XR device 140, the system 120, and the motorized structure, may include communications modules, such as a modem, transceiver, modulator, or other hardware or software configured to enable the device to communicate electronic data through the network.

In some examples, the system 120 can track objects in and around the 3D space 101 using outside-in tracking based on sensors that are external to the components. For example, a camera 111 may be installed in or near the 3D space 101. The system 120 can obtain camera image data from the camera 111 and use the camera image data to track locations and movement of the objects.

In some examples, the XR device 140 can include one or more embedded cameras. The system 120 can obtain image data from the embedded cameras and use the image data to track locations and movement of the objects. In some examples, cameras on the XR device 140 can be used for simultaneous localization and mapping, where a three-dimensional (3D) map of the environment is generated in real time. The system 120 can use machine learning algorithms to determine where the XR device 140 is positioned within that 3D map, using feature detection to reconstruct and analyze surroundings.

The system 120 can run an augmented reality or virtual reality application such as a game. The system 120 can generate an XR environment for presentation to the XR device 140 as an XR image displayed through the XR device 140. An XR image can be an AR image that augments a view of a real-world environment or a VR image that replaces some or all of a view of a real-world environment. The user 110 may view an XR device 140, for example, by wearing an augmented reality headset. Upon activation of the XR device 140, the XR device 140 receives data from embedded cameras and sensors. The XR device 140 may also collect data from other system components. The XR image can be displayed on a wide variety of displays, or directly into the user's eyes, usually through glasses or a headset. Other XR devices include smartphones and tablets. The user 110 can hold these types of devices in their hands and view the display of the smartphone or tablet.

In some examples, the XR device 140 processes image data collected by embedded cameras, determines the locations of the objects within the 3D space 101, and augments the images of the objects. Multiple cameras may be built in the XR device 140, to perform depth sensing, picture recording, video recording, augmentation processing, etc. The XR device 140 may include a screen to augment image data captured by the camera of the device such that the image becomes an interactive environment. The XR device 140 may require significant edge computer processing power and includes many components like a CPU, a GPU, memory, GPS chip, etc.

The system can include one or more cameras, e.g., camera 111, positioned such that the camera 111 can capture images of the 3D space 101 or at least part of the 3D space 101. The camera 111 can be calibrated within the room, e.g., by observing people passing through the room over time.

In some examples, the user 110 can map the 3D space 101 using the XR device 140 or another component of the VR system. For example, the user 110 can wear the XR device 140 while walking around the boundaries of the 3D space 101. The 3D space 101 can be defined relative to fixed tracking cameras, beacons, or features in the property 102.

Coordinate systems of the XR device 140 and of the sensors can be linked. The coordinate system can be linked, for example, by accessing fixed landmarks that are used by the XR system and identifying the landmarks in the fields of view of installed cameras. In some examples, the camera 111 can track the user 110 and/or the XR device 140 as the user 110 travels through a trajectory in the field of view of the camera 111, and the trajectory can be correlated to the position of the user 110 within the 3D space 101 according to the XR system.

In some examples, the system can map the 3D space 101 over time by tracking the user 110 in camera images generated by the camera 111, and storing data indicating the extent of the user's movements. In some examples, the system can infer an assumed 3D space 101 based on the geometry of the room where the 3D space 101 is located. For example, the system can fit a rectangular shaped 3D space into an unobstructed area of the room. In some examples, the system can prompt the user 110, e.g., through a communication to the XR device 140, to directly define the 3D space within the camera field of view, e.g., by walking around an outline of the 3D space 101 in view of the camera 111.

FIG. 1 illustrates a flow of events, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the system 120 obtains 3D space data. For example, the system 120 can obtain 3D space data from the XR device 140. The 3D space data can include data defining boundaries of the 3D space 101.

The 3D space 101 can be mapped to the field of view of the camera 111. In some examples, the XR device 140 communicates coordinates of the 3D space 101 to the camera field of view, e.g., through an API. In some examples, the user 110 can carry a controller while walking around a perimeter of the 3D space 101.

In some examples, the system 120 can assume a 3D space 101 based on observing the user 110. For example, the system 120 can analyze camera images of the user 110 wearing the XR device 140 and moving around the 3D space 101. Based on observing the user 110, the system 120 can infer boundaries of the 3D space. In some instances the system 120 can analyze camera images outside the current boundaries of the 3D space and observe non-users of the XR device 140. Based on observing the non-users around the current boundaries of the 3D space, the system 120 can infer new boundaries of the 3D space.

The system 120 stores the data indicating boundaries of the 3D space 101 mapped to the field of view of the camera 111. The system 120 can actively monitor the 3D space 101 using video analytics and communication with the XR device 140.

The system 120 can keep track of the number of people in the 3D space 101, and thus whether or not the 3D space is empty or in use. In some examples, the system 120 can detect when a first person such as the user 110 enters the 3D space 101. The system 120 can also detect when the user 110 dons and doffs the XR device 140.

When the user 110 is wearing the XR device 140, the system 120 can determine that the user 110 has obstructed vision. In some examples, the system 120 performs monitoring of the 3D space 101 only when the user 110 is wearing the XR device 140. In some examples, the system 120 performs monitoring of the 3D space 101 any time a person is detected within the 3D space 101.

In stage (B), the system 120 obtains sensor data 122. The sensor data 122 can include, for example, camera image data, motion sensor data, geofence data, GPS data, and/or other types of sensor data. For example, the sensor data can include camera image data generated by the camera 111 that is external from the XR device 140.

The sensor data 122 can include camera image data showing a person 130 approaching the 3D space 101. The sensor data 122 can also include motion sensor data, microphone data, and/or other data indicating that the person 130 is approaching the 3D space 101. The sensor data 122 can also include geofence data indicating that a mobile device 115 associated with the person 130 has entered within a geofence of the property 102 where the 3D space 101 is located.

In some examples, the system 120 can store a model of the property 102 and/or portions of the property 102. The model can include data indicating a position of sensors and devices at the property 102. Information of the property layout and of the positions of sensors can enable the system to provide advance warning of a potential 3D space encroachment. For example, a door position sensor or door lock sensor can detect a door opening or unlocking. Based on the door position sensor or door lock sensor, the system 120 can determine that a door to the property 102 has been unlocked and/or opened and that a person is likely approaching the 3D space 101. For example, in stage (B) the system 120 may obtain sensor data that includes sensor data from the door position sensor, where the sensor data indicates a particular door was opened, where the door leads to a hallway that has no other exit than the room that includes the 3D space 101. Based on determining that the particular door was opened, the system 120 can determine that a person is likely approaching the 3D space 101. Based on determining that the person is likely approaching the 3D space 101, the system can alert the user 110 and/or approaching person that an XR experience is in progress and that interference is likely to occur.

In some examples, when the system detects that an XR experience is in progress in the 3D space 101, the system can change monitoring system settings of the property 102 where the 3D space 101 is located. For example, the system can change a security setting by arming the monitoring system when the XR experience begins. In some examples, the system 120 can cause the monitoring system to enter an XR experience "scene" when an XR experience is in progress. In the XR experience scene, the system 120 can arm the monitoring system and/or lock doors to the property 102. In some examples, the system can mute superfluous notifications or divert notifications that would ordinarily go to the user 110. For example, the system can divert a notification from a mobile device of the user to the XR device 140. In some examples, the system can reroute notifications to other occupants of the property 102 that would normally be provided to the user 110.

At stage (C), the system 120 predicts 3D space interference. For example, the system 120 can analyze the sensor data to determine that the person 130 is approaching the 3D space 101 and is about to interfere with the 3D space 101. In some examples, the system 120 can predict interference based on the person 130 approaching within a threshold distance to a boundary of the 3D space 101. The system 120 can also predict interference based on the layout of the property 102 as indicated by the stored model. For example, the stored model may indicate that the 3D space 101 is located in a room between a front door of the property 102 and other rooms of the property 102, such that the only path between the front door and the other rooms passes through the 3D space 101. Thus, the system 120 can determine, based on the front door opening and shutting, that the person 130 is likely to interfere with the 3D space 101.

In some examples, the system 120 can detecting when a bystander such as the person 130 is trying to get the attention of the user 110 wearing the headset. For example, the system 120 can determine, based on analyzing the sensor data 122, that the person 130 is waving towards the user 110, attempting to talk to the user 110, or lingering in or near the 3D space 101 for an extended period of time. The system 120 can determine that the person is attempting to talk to the user 110 based on sensor data including, for example, camera image data indicating that the person 130 is looking towards the user 110, camera image data indicating that the person's mouth is moving, microphone data indicating that the person 130 is speaking, or any combination of these.

The system 120 can also predict 3D space interference by objects other than a person. For example, the system 120 can predict interference by an inanimate object such as a robotic cleaning device. In another example, the system 120 can predict interference by an animal. The system 120 can predict interference by objects similarly to predicting interference by a person, e.g., by determining that the object is within a threshold distance to a boundary of the 3D space 101 or by determining, based on the property layout and the current location of the object, that the object is likely to pass through the 3D space 101.

In some examples, the system 120 can predict 3D space interference by an object based on tracking paths of the object. For example, a robotic cleaning device may be programmed to travel a designated route around the property. The system 120 can track movement of the robotic cleaning device over time in order to learn the designated route. In another example, the system 120 can store data indicating capabilities and limitations of the robotic cleaning device. For example, the system 120 can store data indicating that the robotic cleaning device is not capable of operating on carpeted floors, is not capable of ascending and descending steps, and can only make turns that have an angle of less than ninety degrees. Based on the capabilities and limitations of the robotic cleaning device, the system 120 can predict the route of the robotic cleaning device.

In some examples, the system 120 can control operations of the cleaning device, or can be in communication with a different computing system that controls operations of the robotic cleaning device by sending instructions to the robotic cleaning device. The system 120 can determine, based on instructions sent to the robotic cleaning device, whether the robotic cleaning device is likely to interfere with the 3D space 101. In some examples, the system 120 can communicate with the robotic cleaning device, e.g., through a network. The robotic cleaning device can transmit, to the system 120, data indicating the planned route of the robotic cleaning device.

In some examples, the system 120 may detect that a person, object, or animal is in or near the 3D space 101 when the user 110 first dons the XR device 140. Based on the user 110 donning the XR device 140, the system 120 can perform an action to mitigate or prevent interference by the person, object, or animal. For example, system 120 can transmit a notification to the XR device 140 that the person, object, or animal is in the 3D space 101. This can enable the user 110 to take an action to remove the person, object, or animal from the 3D space 101 before beginning an XR experience.

In some examples, the system 120 can take an action to assist with removing the person, object, or animal from the 3D space 101 in response to the user 110 donning the XR device 140. For example, the system 120 can broadcast an audible alert through a speaker, or can illuminate a light, that indicates that the 3D space 101 is in use. In some examples, the system 120 can transmit a command to an autonomous or remote-controlled object that causes the object to depart from the 3D space 101. For example, a robotic cleaning device may be located in the 3D space 101. The system 120 can transmit a command to the robotic cleaning device that causes the robotic cleaning device to depart from the 3D space 101.

The system 120 can also detect when the user 110 doffs the XR device 140 and/or departs from the 3D space 101. Based on sensor data indicating that the user 110 has removed the XR device 140, the system 120 can determine that the XR experience is paused or has ended. Based on determining that the XR experience is paused or has ended, the system 120 can cancel warnings and notifications that are preventing interference of the 3D space 101. In some examples, based on determining that the XR experience is paused or has ended, the system 120 can notify other residents of the property 102 that the 3D space 101 is no longer in use.

In some examples, the system 120 can distinguish between a paused XR experience and a completed XR experience, e.g., based on an amount of time that the user 110 is not wearing the XR device 140. For example, a threshold amount of time for a pause may be two minutes. When the user 110 removes the XR device 140, the system 120 can determine that the XR experience is paused. Based on the user 110 keeping the XR device 140 off for greater than the threshold amount of time of two minutes, the system 120 can determine that the XR experience has ended.

In stage (D), the system 120 provides a notification 114 to a user device, e.g., mobile device 115. For example, based on determining that the person 130 is approaching the 3D space 101, the system 120 can transmit the notification 114 to the mobile device 115 associated with the person 130. The notification 114 can include, for example, a text message that says "Warning: approaching XR 3D space." In some examples, the notification 114 can include an audible of visual alert, e.g., an alert sound or flashing light.

In some examples, the system can store profiles of residents of the property 102. The profiles can include, for example, facial images of residents of the property 102. The system 120 can use the stored facial images to perform facial recognition of people at the property 102. In some examples, the profiles can include data identifying one or more devices associated with each resident of the property 102. For example, the system 120 can store data identifying the mobile device 115 associated with the person 130. Thus, when the system 120 determines that the facially recognized person 130 is approaching the 3D space 101, the system 120 can send the notification to the mobile device 115 indicated by the stored data as associated with the person 130.

In some examples, instead of or in addition to sending the notification 114 to the mobile device 115, the system 120 can send a notification to the XR device 140. For example, the system 120 can send a notification to the XR device 140 that causes the XR device 140 to display a message to the user 110. The message can say, for example, "person approaching 3D space." In some examples, the system 120 can determine that the person 130 is attempting to get the attention of the user 110, and the notification displayed by the XR device 140 can indicate to the user 110 that the person 130 is attempting to get the user's attention. For example, the XR device 140 can display a message that says "your brother is trying to get your attention." In some examples, the XR device 140 can display an image or video of the person 130 captured by the camera 111.

In some examples, the XR device can represent the person 130 in the XR environment. For example, based on determining that the person 130 is attempting to get the user's attention, the system 120 can generate a surrogate or avatar in the XR experience that represents the person 130. Microphones at the property 102 can detect audio, e.g., speech spoken by the person 130. The microphones can provide the audio to the XR device 140 through the system 120. The XR device 140 can then play the audio for the user 110 through speakers of the XR device 140. In this way, the XR device 140 can permit the user 110 to communicate with the person 130 through the XR device 140. In some examples, the XR device 140 can represent the avatar in a way that visually indicates to the user 110 that the avatar represents a real-world object. For example, the XR device 140 can present the avatar as transparent or blinking, to indicate that the avatar represents a real world person.

In some examples, instead of or in addition to sending the notification to the mobile device 115, the system 120 can communicate with the user 110 and/or the person 130 using other means. For example, the system 120 can communicate by activating an audible notification, alert, or alarm. The system 120 can cause the notification to be broadcast through a speaker near the 3D space 101. For example, the system 120 may identify the speaker closest to the person 130 that may be used for broadcasting a notification, and then transmit audio of synthesized speech of the notification to the speaker. In some examples, the system 120 can communicate by activating a visual notification, alert, or alarm. The visual notification can include, for example, a flashing light, a message shown on display panel, or another visual notification.

In some examples, the system 120 can cause an illumination of the 3D space 101. For example, the system 120 can activate a light to project onto the floor. The light can illuminate an outline of the 3D space 101 and/or the area of the 3D space 101. In some examples, the system 120 can activate laser light that illuminates the outline of the 3D space 101 and/or of virtual objects within the 3D space. The illuminated outline of the 3D space 101 can serve as a visual aid to non-participants of the XR experience in avoiding the 3D space 101.

In some examples, the system 120 may determine that the XR experience should be paused due to the detected or predicted interference. For example, the system 120 may determine that the person 130 is attempting to get the attention of the user 110 and that the person 130 is a child. The system 120 can determine to pause the XR experience so that the user 110 can address the child. The system 120 can therefore send an instruction to the XR device 140 that pauses the XR device.

In some examples, the system 120 can determine one or more actions to perform based on settings and preferences input by the user 110. For example, the user 110 can input a preference that the XR experience should be interrupted when a child is attempting to get the attention of the user 110, but should not be interrupted when an adult is attempting to get the attention of the user 110.

In some examples, the system 120 may determine that the person 130 is in or near the 3D space 101 when the user 110 dons the XR device 140. The system 120 may send the notification 114 to the person 130 indicating that the 3D space 101 is going to be in use and that the person 130 should exit and/or avoid the 3D space 101.

The environment 100 can generate alerts and notifications to the user 110 and other persons based on monitored actions and system settings. Notifications can include, for example, alerting the user 110, as the user 110 enters the 3D space 101 or begins to don the XR device 140, about objects in the 3D space 101.

The system can alert the user 110, after the user 110 dons the XR device 140, about approaching animals, people, or new objects in the 3D space 101. The system can alert the user 110 of any bystanders attempting to get the attention of the user 110. The system can alert the user 110 if the user 110 nears an edge of the 3D space 101 or departs the 3D space 101. The system can also alert bystanders if the user 110 departs the 3D space 101 while wearing the XR device 140.

The system can alert bystanders if they approach or enter the 3D space 101 while the user 110 is wearing the XR device 140. The system can alert the user 110 or bystanders if they have left an object in the 3D space 101 as they are exiting the 3D space 101.

The system can alert people at the property 102 when the user 110 enters the 3D space 101 and/or dons the XR device 140. The system can also alert people at the property 102 when the XR session is complete.

Alerts to the user 110 can be made through audio, haptic alerts, and/or via an API that allows alerting or in-game notification within the XR device 140. This could include passing the location and/or a 3D model of any person, animal, or obstacle that is inside or outside of the 3D space 101 to the XR device 140 so that they might render the obstacle or a surrogate object to the user within the XR space. This could include a "ghost" version of the person, animal, or object. The system might render an unexpected object in the scene in a different style or color to call attention to the object as real-world physical object as opposed to a virtual object. In addition, moving and stationary real-world objects might be rendered differently from each other.

Alerts to the person 130 can include audio alerts, a status display, or a projected 3D space indication on the floor, walls, and/or ceiling of the property 102. In some cases, this could include alerts to a mobile device. Audio alerts might include a prerecorded or automatically generated description of the extent of the 3D space 101, video notifications on a status display, mobile device, or an AR interface that shows a diagram or marked up imagery.

A projection onto the surfaces of the room or an AR interface can also show the bystander select cues from the user's XR session, such as obstacles and goals. The link between calibrated cameras and the XR 3D space could be used to inform the XR device 140 about other aspects of the 3D space 101 and its surroundings. Examples include hazards inferred from imagery or 3D reconstruction that might warrant shrinking the 3D space out of caution such as a nearby staircase or window, and/or an overhanging lamp or furniture.

Figure 2:
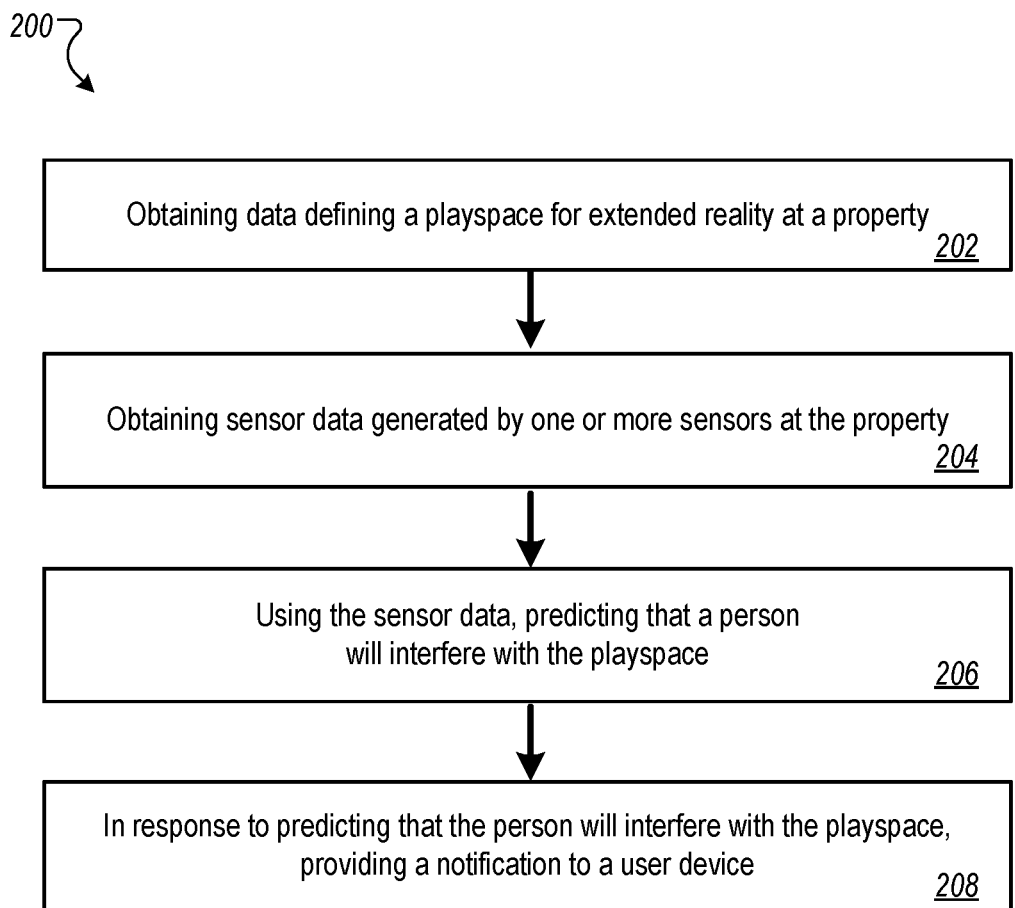
FIG. 2 is a flow diagram of a process for monitoring XR 3D spaces.

FIG. 2 is a flow diagram of a process for monitoring XR 3D spaces. The process 200 can be performed by one or more computing devices, for example, the system 120 or the XR device 140.

The process 200 includes obtaining data defining a 3D space for XR at a property (202). For example, the system 120 obtains, from the XR device 140, data defining a 3D space 101.

The process 200 includes obtaining sensor data generated by one or more sensors at the property (204). For example, the system 120 obtains sensor data 122 from sensors including, for example, the camera 111.

The process 200 includes, based on the sensor data, predicting that a person will interfere with the 3D space (206). For example, the system 120 can predict, based on the sensor data 122, that the person 130 will interfere with the 3D space 101.

The process 200 includes, based on predicting that the person will interfere with the 3D space, providing a notification (208). For example, based on predicting that the person 130 will interfere with the 3D space 101, the system 120 can provide the notification 114 to the mobile device 115.

Figure 3:
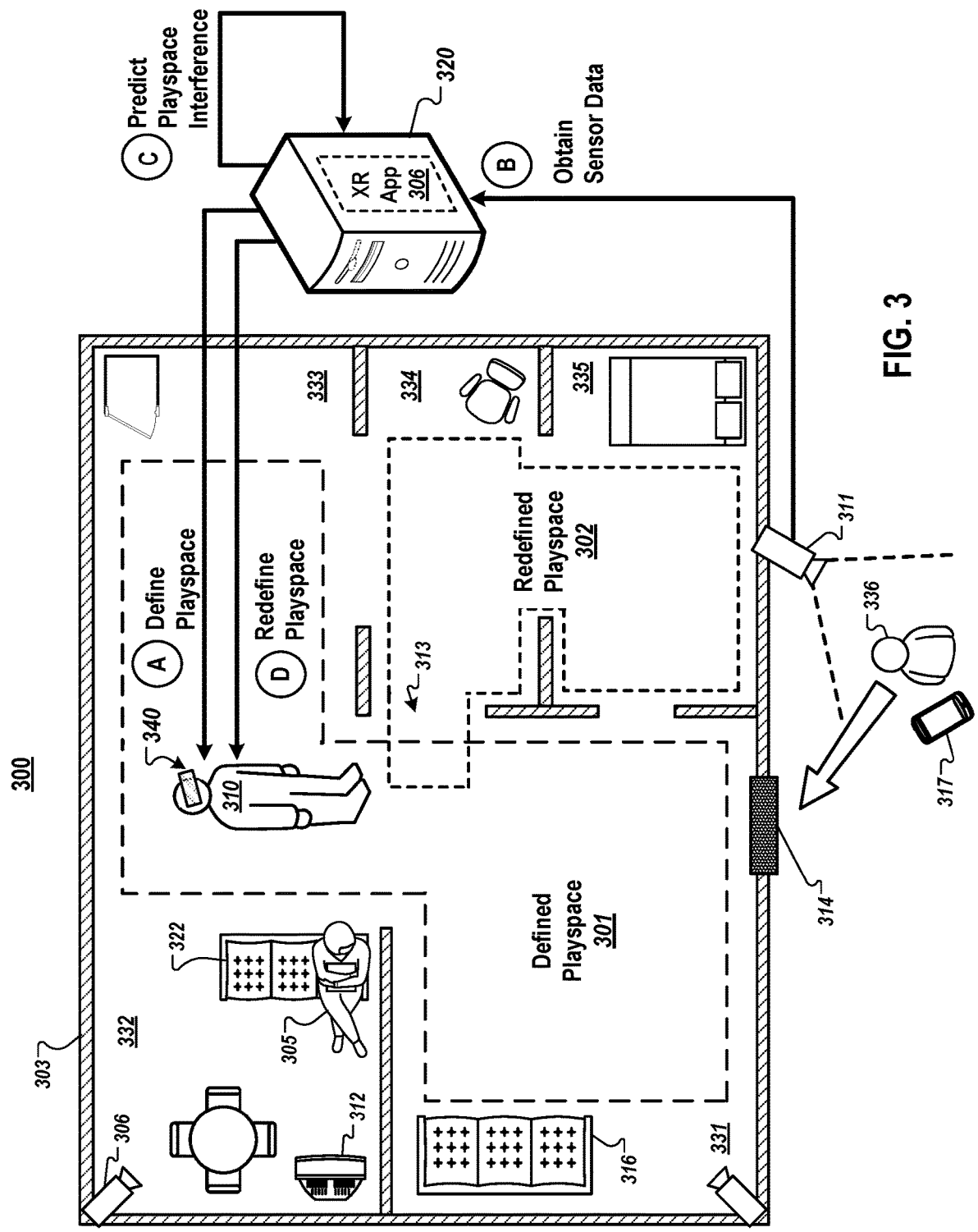
FIG. 3 is a diagram illustrating an example of a system for dynamic XR 3D space management.

FIG. 3 is a diagram illustrating an example of a environment 300 for dynamic XR 3D space management. The environment 300 includes a system 320 and an XR device 340. The system 320 runs an XR application 306. XR environments generated by the XR application 306 are provided to the XR device 340 for presentation to a user 310. In some examples, the XR device 340 runs the XR application 306 instead of the system 320.

In some examples, the XR device 340 can include a wearable computing system that performs the functions of the system 320. For example, the computing system can be integrated with the headset. In some examples, the XR device 340 includes a headset and a separate wearable computing system that performs the functions of the system 320. For example, the XR device 340 can include a wearable computing system that is integrated with a backpack, vest, harness, and/or another garment or accessory. The XR device 340 can also include one or more controllers and/or trackers that are worn by or carried by the user 310.

The defined 3D space 301 can be any space in which a user 310 uses an XR device 340. For example, the defined 3D space 301 can be a room of a building or an outdoor area. The defined 3D space 301 can be a mostly empty space where the user 310 can freely move about without tripping over hazards or bumping into objects in the real world.

Components of the environment 300 can communicate through a network. The network may be any communication infrastructure that supports the electronic exchange of data between the device sand the sensors. The network may include a local area network (LAN), a wide area network (WAN), the Internet, or other network topology. To support communications through the network, the components, e.g., the XR device 340, the system 320, and the motorized structure, may include communications modules, such as a modem, transceiver, modulator, or other hardware or software configured to enable the device to communicate electronic data through the network.

The system 320 may be located within or outside of the property 303. The system 320 is in communication with the XR device 340. The system 320 may be, for instance, one or more computer systems, server systems, or other computing devices. In some examples, the system 320 may be a cloud computing platform.

The system 320 can store a model of the property 303. The model can be, for example, a 3D model indicating locations of features of the property 303 include walls, doors, furniture, etc. For example, the system 320 can store data indicating features of the property 303 that may serve as boundaries of the 3D space. Boundaries of the 3D space can be physical boundaries, e.g., walls, or can be virtual boundaries input by the user 310. For example, the user 310 may input a boundary corresponding to the location of the sofa 322, indicating that the 3D space should not extend into the living room 332 past the location of the sofa 322.

The system 320 can run an augmented reality or virtual reality application such as a game. The system 320 can generate an XR environment for presentation to the user 310 as an XR image displayed through the XR device 340. The XR image can be displayed on a wide variety of displays, or directly into the user's eyes, usually through glasses or a headset. Other XR devices include smartphones and tablets. The user 310 can hold these types of devices in their hands and view the display of the smartphone or tablet.

FIG. 3 illustrates a flow of events, shown as stages (A) to (D), with each representing a step in an example process. Stages (A) to (D) may occur in the illustrated sequence, or in a sequence that is different from the illustrated sequence. For example, some of the stages may occur concurrently.

In stage (A), the system 320 provides a defined 3D space 301 to the XR device 340. The system 320 can provide a defined 3D space 301 based on availability of spaces at the property 303, based on requirements of the XR application 306, or both.

The system 320 can provide the defined 3D space 301 based at least in part on the predicted availability of spaces at the property 303. For example, the system 320 can store data indicating routines of residents of the property 303. For example, the system 320 can store data indicating that the resident 336 typically departs for work on weekdays at 8:00 am and returns from work on weekdays at 6:00 pm.

In some examples, the system 320 can track activities and/or locations of residents of the property 303 in order to predict availability of spaces at the property 303. For example, the system 320 can track the location of the resident 336 based on geofence data indicating whether a mobile device 315 associated with the resident 336 is inside or outside of a geofence of the property 303. In another example, the system 320 can determine that the person 305 is in the living room 332 based on camera image data received from the camera 311.

In some examples, the system 320 can store data indicating probabilities that spaces of the property 303 will be occupied at various times. The system 320 can determine the probabilities of occupancy for the spaces based on analyzing sensor data over time. For example, the system 320 may determine that on Saturday mornings, there is a thirty percent chance that the living room 332 will be unoccupied and will therefore be available for use as an XR 3D space. The system 320 may also determine that on Saturday mornings, there is an eighty percent chance that the office 334 will be unoccupied and will therefore be available for use as an XR 3D space.

In some examples, the system 320 can determine, for each space or area of the property 303, a current occupation status of the space, a predicted occupation status of the space, and an expected time of availability of the space. For example, the system 320 can determine, for the living room 332, that the living room 332 is currently occupied by the person 305, that the person 305 is likely to depart the living room 332 at 7:00 pm, and a likelihood of sixty percent that the living room will be available for use as an XR 3D space from 7:00 pm to 9:00 pm. The system 320 can also determine a status of appliances, e.g., an on/off status for a television 312, and a status of accesses, e.g., an open/shut status for doors at the property 303. The system 320 can define a 3D space based on the status of appliances and of accesses. For example, the system 320 might define a 3D space that does not include the office 334 when doors to the office are shut. In another example, the system 320 might define a 3D space that does not include the living room 332 when the television 312 is on.

In some examples, the system 320 can select areas of the property for inclusion in a 3D space based on monitoring system scenes. For example, a monitoring system may of the property 303 may have a "sleep" scene set in the bedroom 335. The system 320 can determine to exclude the bedroom 335 from the 3D space based on the "sleep" scene being set. In some examples, the system 320 can select areas of the property for inclusion in a 3D space based on security settings of a monitoring system. For example, the monitoring system may be set to "armed, stay," "unarmed, stay," or "armed, away." The system 320 can determine to include the foyer 331 in the 3D space based on the security system being "armed, stay."

In an example scenario, the system 320 may determine that there is a seventy percent chance that the foyer 331 will be available for use as an XR 3D space on weekday afternoons. The system 320 can store criteria indicating a threshold availability likelihood required for reserving a space. The threshold availability likelihood for reserving a 3D space may be, for example, a minimum threshold of sixty percent. Based on the seventy percent chance that the foyer 331 is available exceeding the minimum threshold of sixty percent, the system 320 can determine to reserve the foyer 331 on weekday afternoons. The system 320 can therefore generate, for use on a weekday afternoon, the defined 3D space 301 including the foyer 331.

In another example scenario, the system 320 may determine that there is a forty percent chance that the foyer 331 will be available for use as an XR 3D space on Sunday mornings. Based on the forty percent chance that the foyer 331 is available being less than the minimum threshold of sixty percent, the system 320 can determine not to reserve the foyer 331 on Sunday mornings.

In some examples, the system 320 can select areas of the property for inclusion in a 3D space based on a relative likelihood of availability. For example, the system 320 can select areas of the property 102 that have a lesser likelihood of occupancy and/or a greater likelihood of availability compared to other areas of the property. As an example, on a Saturday evening, the server may determine that the kitchen 333 has a thirty percent chance of availability, the living room 332 has a twenty percent chance of availability, the office 334 has a forty percent chance of availability, and the bedroom 335 has a forty-five percent chance of availability. In an example where the XR experience requires an amount of space of two rooms, the system 320 can select the office 334 and the bedroom 335 for inclusion in the 3D space based on the office 334 and the bedroom 335 having higher likelihoods of availability compared to the other rooms of the property 102. In an example where the XR experience only requires an amount of space of one room, the system 320 can select the bedroom 335 for inclusion in the 3D space based on the bedroom 335 having the highest likelihood of availability compared to the other rooms of the property 102.

In some examples, the defined 3D space can include time-varying boundaries. For example, the defined 3D space 301 can include the foyer 331 between 5:00 pm and 6:00 pm, when the foyer 331 is expected to be unoccupied. The defined 3D space 301 can be changed to not include the foyer 331 after 6:00 pm, when the resident 336 is expected to return home.

The XR device 340 receives the defined 3D space 301 from the system 320. The defined 3D space includes the foyer 331 and the kitchen 333. The XR device 340 generates an XR environment based on the defined 3D space 301. In some examples, the XR device 340 and/or the XR application 306 can adapt an XR narrative based on the defined 3D space 301. For example, a second phase of a narrative may require a greater amount of space than a first phase of the narrative. The XR application 306 can delay entering the second phase of the narrative until a larger space is available at the property 303 for use in the XR 3D space.

In some examples, the system 320 can communicate the defined 3D space 301 to a monitoring system of the property 303 in order to reserve the defined 3D space 301. The monitoring system can be managed by the system 320 or by a different server.

In an example, the system 320 communicates a request to reserve the defined 3D space 301 including the foyer 331 and the kitchen 333 from 4:00 pm to 5:00 pm. In response to receiving the request to reserve the defined 3D space 301, the monitoring system can approve the request, deny the request, or approve the request with modifications. In some examples, the monitoring system can approve the request and send a notification to other residents of the property 303 indicating that the defined 3D space 301 has been reserved from 4:00 pm to 5:00 pm. In some examples, the monitoring system can deny the request, e.g., based on determining that the resident 336 is likely to return to the property at 4:30 pm. In some examples, the monitoring system can approve the request with modifications. For example, based on determining that the resident 336 is likely to return to the property at 4:30 pm, the monitoring system can approve the request to reserve the defined 3D space 301 only from 4:00 pm to 4:30 pm.

In stage (B), the system 320 obtains sensor data. The sensor data can include any of the sensor data 122 described with reference to FIG. 1. The sensor data can include, for example, camera image data captured by the camera 311. The camera image data can include images of the resident 336 arriving at the property 303. In some examples, the sensor data can include data indicating a location of the resident 336. For example, the sensor data can include GPS data indicating a location of the mobile device 317 and/or a location of a vehicle associated with the resident 336.

In stage (C), the system 320 predicts 3D space interference. For example, the system 320 can analyze the sensor data and determine, based on the sensor data, that the resident 336 is arriving at the property 303. The system 320 may determine that the resident 336 is likely to enter the foyer 331 and therefore is likely to interfere with the defined 3D space 301.

In some examples, the sensor data can indicate that the 3D space 301 has been interfered with. For example, the sensor data can include door open and shut data indicating that the door 314 has opened and shut, and that the resident 336 is likely in the foyer 331. In another example, motion sensor data and/or camera image data can indicate that the resident 336 has entered the foyer 331.

In some examples, the system 320 can update predicted and/or detected occupancy of areas of the property 303 based on the sensor data. For example, the system 320 can determine, based on historical data indicating routines of the resident 336, that when the resident 336 returns home, there is a sixty percent probability that the resident 336 will walk through the foyer 331 to the kitchen 333, a thirty percent probability that the resident 336 will walk through the foyer 331 to the living room 332, and a ten percent probability that the resident 336 will enter the foyer 331 and sit on the sofa 316. The system 320 can therefore update the predicted occupancy of the foyer 331, e.g., to one hundred percent, and update the predicted occupancy of the kitchen 333, e.g., to sixty percent, based on determining that the resident 336 is returning home and based on the historical data.

The system 320 can use the predicted occupancies to predict a likelihood of 3D space interruption and to determine, based on the likelihood of 3D space interruption, whether to redefine the 3D space. For example, the system 320 may determine a percentage likelihood of interruption, and compare the determined likelihood of interruption to a threshold likelihood of interruption. The threshold likelihood of interruption can be, for example, a maximum threshold likelihood of fifty-five percent. Based on the likelihood of interruption exceeding the maximum threshold likelihood of fifty-five percent, the system 320 can determine to redefine the 3D space. Based on the likelihood of interruption being less than the maximum threshold likelihood of fifty-five percent, the system 320 can determine not to redefine the 3D space.

In stage (D), the system 320 provides a redefined 3D space 302 to the XR device 340. The redefined 3D space 302 includes the office 334 and the bedroom 335, and excludes the foyer 331 and the kitchen 333.

The XR application 306 can adjust the XR environment narrative based on the redefined 3D space 302. The XR application 306 can re-evaluate the mapping of the XR environment to the redefined 3D space 302, and guide the user 310 to the redefined 3D space 302. In the example of FIG. 3, the XR application 306 adjusts the narrative of the XR experience to guide the user 310 from the kitchen 333 to the office 334. In this way, the XR application 306 adjusts the XR environment in a way that causes the user 310 to avoid the unavailable areas that are occupied or predicted to be occupied by the resident 336.

In some examples, the XR application 306 can adjust the XR environment to delay the user 310 and cause the user 310 to remain in their current location during 3D space interference. For example, the user 310 may be located near the sofa 316 in the foyer 331 when the resident 336 enters the foyer 331. The XR application 306 can adjust the XR environment to keep the user 310 near the sofa 316 while the resident 336 passes through the foyer 331. For example, the XR application 306 can present a task to the user 310 for the user 310 to perform in the foyer 331. In another example, the XR application 306 can present an environment to the user 310 that appears to change locations without the user 310 needing to physically move to a new location. In some examples, the XR application 306 can pause the XR experience while the resident 336 passes through the foyer 331. The XR application 306 can then resume the XR experience when the resident 336 enters the kitchen 333, and guide the user 310 to the redefined 3D space 302.

In some cases, the XR application 306 can pause the XR experience while the user 310 transits to the redefined 3D space 302. In some examples, the XR application 306 can model real-world features in the XR experience. For example, the user 310 may need to open a door to pass through a doorway 313 in order to enter the office 334. The XR application 306 can render the doorway 313 in the XR experience, allowing the user 310 to open the door, both inside the XR experience and in the physical property 303.

In some cases, the XR application 306 can adapt the XR environment to fit to the physical space available at the property 303. For example, the XR application 306 can fit a graph of an XR experience to a graph of the redefined 3D space 302. In some examples, the XR application 306 can gradually shift the location or orientation of the user 310 within the XR environment to better fit the physical space available at the property 303. For example, the user 310 might be walking down a straight hallway in the real world, but in the XR environment, the hallway might be curved. The augmentation of the XR environment can aid the user 310 in avoiding real-world obstacles while not interfering with the XR environment experience.

Figure 4:
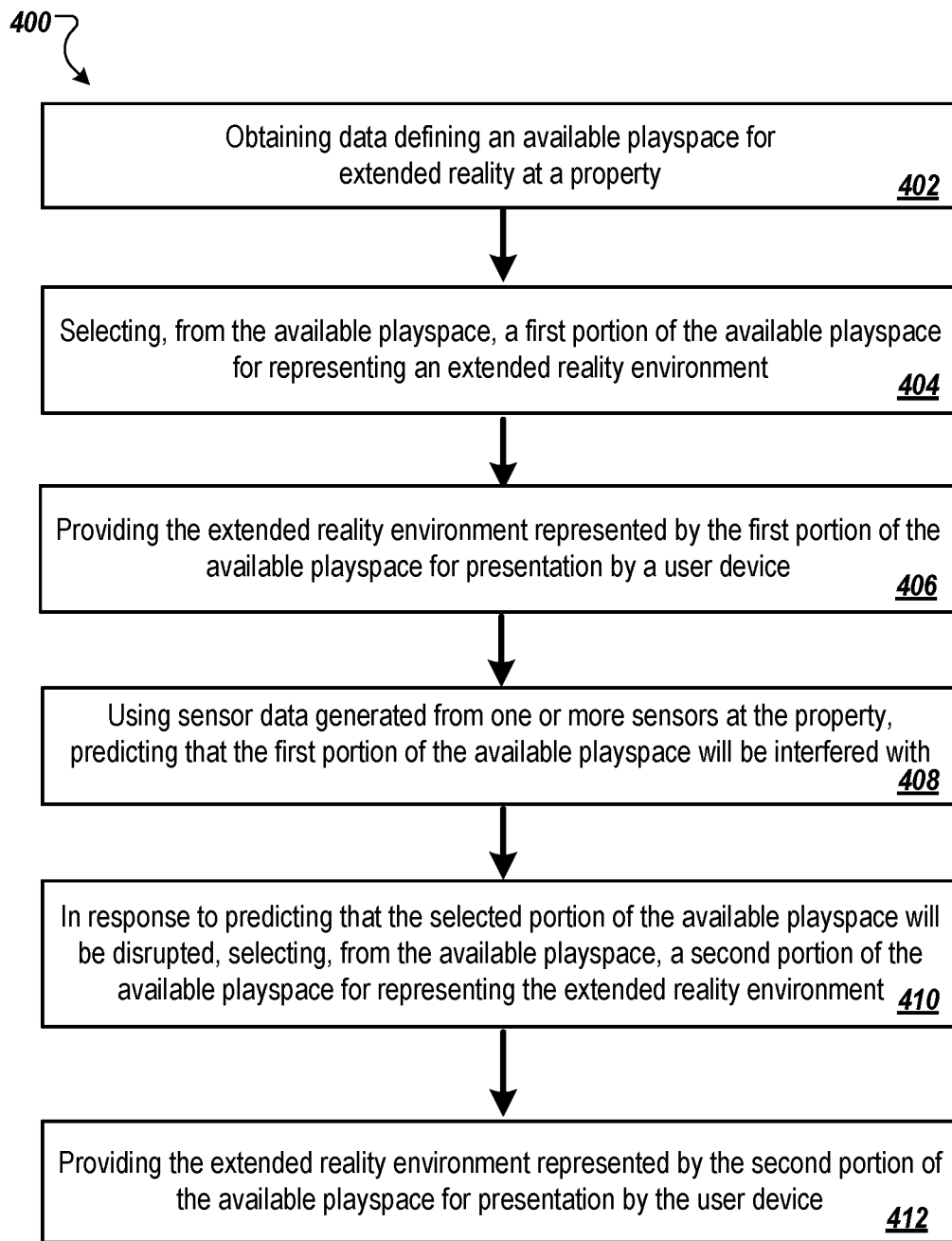
FIG. 4 is a flow diagram of a process for dynamic XR 3D space management.

FIG. 4 is a flow diagram of a process 400 for dynamic XR 3D space management. The process 400 will be described as being performed by one or more computing devices, for example, the system 320 or the XR device 340.

The process 400 includes obtaining data defining an available 3D space for XR at a property (402). For example, the system 320 can obtain, from the XR device 340, data defining areas of the property 303 that are available for use as a 3D space. The available areas of the property 303 can include sections of a foyer 331, living room 332, kitchen 333, office 334, and bedroom 335.

The process 400 includes selecting, from the available 3D space, a first portion of the available 3D space for representing an XR environment (404). For example, the system 320 can select, from the available 3D spaces a defined 3D space 301.

The process 400 includes providing the XR reality environment represented by the first portion of the available 3D space for presentation by a user device (406). For example, the system 320 can provide the XR environment represented by the defined 3D space 301 for presentation by the XR device 340 to the user 310.

The process 400 includes, based on sensor data generated from one or more sensors at the property 303, predicting that the first portion of the available 3D space will be interfered with (408). For example, based on sensor data generated from the camera 311, the system 320 can predict that the defined 3D space 301 will be interfered with by the resident 336 arriving at the property 303. The system 320 can determine a probability, or likelihood, that the 3D space 301 will be interfered with and can compare the probability of disruption to a threshold probability, e.g., a threshold probability of fifty percent. Based on the probability of disruption exceeding the threshold probability, the system 320 can predict that the defined 3D space 301 will be interfered with.

The process 400 includes, based on predicting that the selected portion of the available 3D space will be interfered with, selecting, from the available 3D space, a second portion of the available 3D space for representing the XR environment (410). For example, based on predicting that the defined 3D space 301 will be interfered with, the system 320 can select, from the available 3D space at the property 303, a redefined 3D space 302.

The process 400 includes providing the XR environment represented by the second portion of the available 3D space for presentation by the user device (412). For example, the system 320 can provide the XR environment represented by the redefined 3D space 302 for presentation by the XR device 340.

Figure 5:
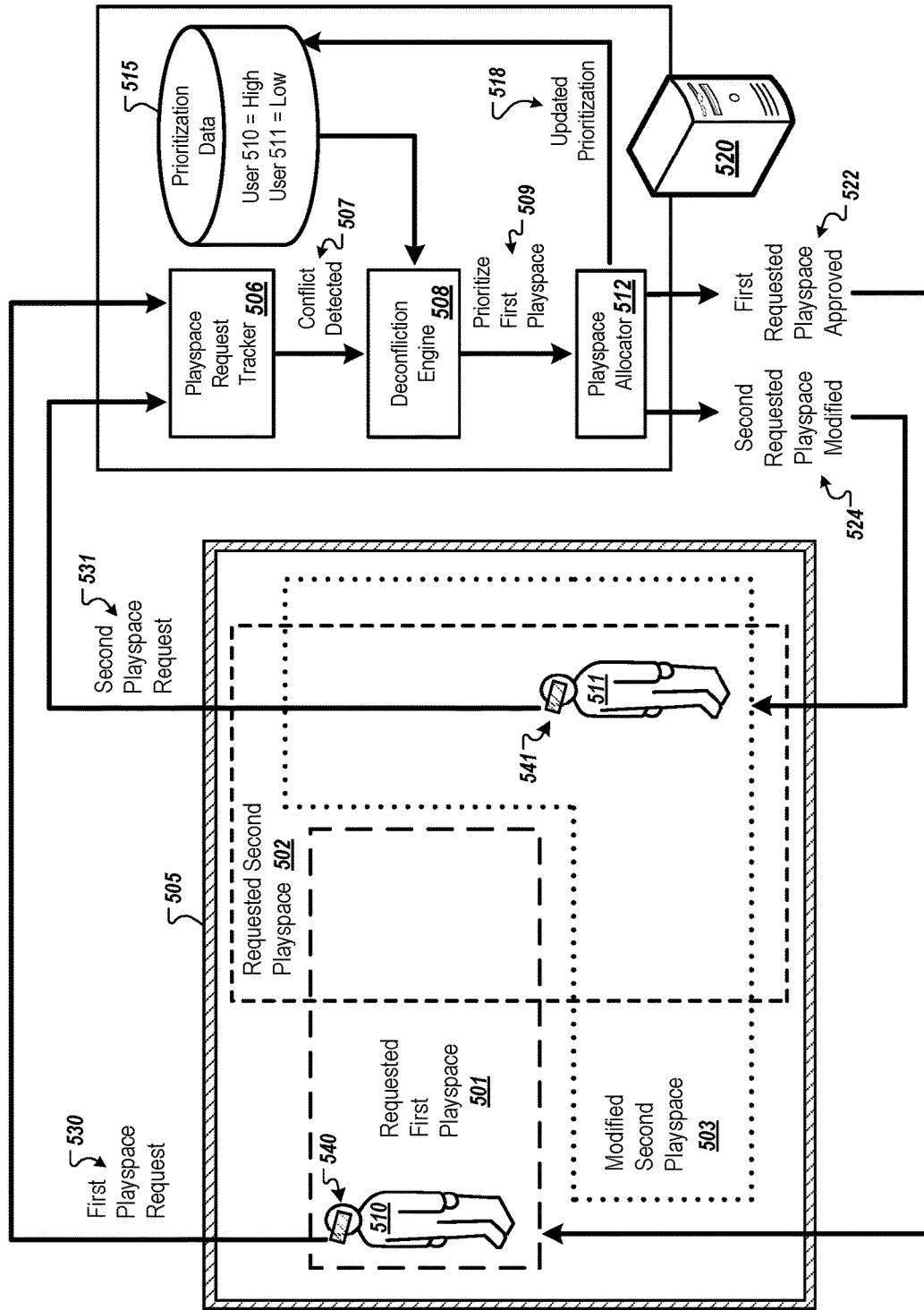
FIG. 5 is a diagram illustrating an example of a system for coordination of multiple XR 3D spaces.

FIG. 5 is a diagram illustrating an example of a environment 500 for coordination of multiple XR 3D spaces. The environment 500 includes a system 520. The server maintains and deconflicts 3D space reservations from multiple users. The system 520 manages 3D spaces in an arena 505. The arena 505 can be, for example, a dedicated room for XR 3D spaces. In some examples, the arena is a property that is occupied by multiple users of XR devices. The system 520 allocates 3D spaces in the arena to each of the multiple users.

In the example of FIG. 5, a first user 510 uses a first XR device 540 and a second user 511 uses a second XR device 541 in the arena 505. The first XR device 540 sends a first 3D space request 530 to the system 520. The first 3D space request 530 includes a request to reserve a requested first 3D space 501. The second XR device 541 sends a second 3D space request 531 to the system 520. The second 3D space request 531 includes a request to reserve a requested second 3D space 502.

Each 3D space request can include data defining boundaries of the requested 3D space. For example, the 3D space request can include a 2D area and/or a 3D volume of space requested for use in a 3D space. Each 3D space request can also include a predicted time that the area is expected to be in use by the user.

In some examples, the XR device 540 can run an XR application that generates the first 3D space request 530 based on a planned XR environment to be presented to the first user 510. The XR application can estimate an amount of time that the user needs to complete a task in a currently reserved area, and an amount of time the user will need in a next area. The XR device 540 can generate the first 3D space request 530 based on the estimated time for the tasks.

As an example, the first user 510 may currently be performing a task that requires the first user 510 to be stationary, and may therefore be using a small area of the arena 505. The XR application may predict that the first user 510 will complete the current task at 12:10 pm. The XR application may determine that the user's next task requires a larger space, e.g., the requested first 3D space 501, and that the next task will take approximately fifteen minutes to complete. Thus, the XR device 540 can submit the first 3D space request 530 to request the requested first 3D space 501 from 12:10 pm to 12:25 pm.

The XR device 540 can send updated requests as the user's predicted actions change. For example, the first user 510 may take longer to complete the current task than expected, and may complete the current task at 12:15 pm. The XR device 540 can therefore send an updated first 3D space request that requests the requested first 3D space 501 from 12:15 pm to 12:30 pm.

The 3D space request tracker 506 receives the first 3D space request 530 and the second 3D space request 531. The 3D space request tracker 506 can monitor for conflicts between requested 3D spaces. When two or more XR devices request use of a same area of the arena 505, the 3D space request tracker 506 detects a detected conflict 507. For example, the requested first 3D space 501 and the requested second 3D space 502 overlap in time and space. The 3D space request tracker 506 can detect the overlap between the requested 3D spaces and output data indicating the detected conflict 507. The indication of the detected conflict 507 can include an area or volume of the arena 505 where the conflict is occurring, a time of the conflict, and an identification of the XR devices that requested the conflicting 3D spaces.

When the 3D space request tracker 506 does not detect a conflict between 3D space requests, the 3D space request tracker 506 can output data to the 3D space allocator 512 indicating that no conflict has been detected. The 3D space allocator 512 can then allocate the 3D spaces according to the 3D space requests.

When a conflict is detected, the deconfliction engine 508 performs deconfliction of the detected conflict 507. The deconfliction engine 508 can deconflict the conflict, e.g., by determining a priority of the 3D space requests. The deconfliction engine 508 can determine the priority of the 3D space requests at least in part on prioritization data 515.

The prioritization data 515 can include data indicating priorities of different users, XR devices, and/or XR applications. In some examples, the prioritization data 515 can include data indicating priorities of different XR applications. For example, a first XR application may be highly physically interactive, and require that the user be able to move through a large space. In contrast, a second XR application may less physically interactive, and a user may be able to experience the second XR application in a smaller space. Therefore, the first XR application may be assigned a higher priority than the second XR application based on the relative space requirements of the first XR application and the second XR application.

In another example, a first XR application may require use of a specific feature of the arena, e.g., a staircase. In a second XR application, the staircase may be an optional feature. Thus, the prioritization data 515 can include data specifying that the first XR application has a higher priority than the second XR application when the overlapping region includes the staircase.

In another example, a first XR application may have less time flexibility than a second XR application. For example, the first XR application may require the user to perform actions in a time limit, and/or might not have options for delaying activities within the XR experience. The second XR application may have no time limit, or a less restrictive time limit compared to the first XR experience. The second XR application may also have options for delaying activities, e.g., by presenting the user with extra tasks that cause the user to remain in place. Thus, the first XR application may be assigned a higher priority than the second XR application based on the stricter time requirements of the first XR application compared to the second XR application.

In some examples, the prioritization data 515 can change over time based on the XR experiences. In some examples, user priority may be determined based on respective times of arrival at the arena 505 and/or starting times of the XR experiences. For example, the first user 510 may arrive at the arena at 11:30 and the second user 511 may arrive at the arena at 11:40. The first user 510 can therefore be assigned a higher priority than the second user 511. When the first user 510 departs the arena 505, the second user 511 can move up to a higher priority.

In some examples, the prioritization data 515 can change based on limitations of the current 3D space assignments. For example, a first XR application may require a small amount of space during a first time period, and a larger amount of space during a second time period. The first XR application may therefore be assigned a lower priority during the first time period, and a higher priority during the second time period.

In another example, the first XR application may be assigned a small corner area 3D space during the first time period, where the 3D space is confined by other users' 3D spaces. The system 520 may determine that the user of the first XR application needs to cross the 3D space of a second XR application in order to transit from the corner area to a larger 3D space for use during the second time period. The system 520 can therefore temporarily assign the first XR application a higher priority than the second XR application during the time when the user is transiting from the corner area 3D space to the larger 3D space. By assigning the temporary higher priority, the user of the first XR application can be permitted to cross the 3D space of the second XR application, e.g., while the user of the second XR application is delayed or paused within the XR experience.

In some examples, users may pay to use the arena 505 for XR experiences. There may be multiple different tiers of users based on the amount that the users pay for the service. For example, the first user 510 may pay for a top tier service, and therefore be assigned a higher priority. The second user 511 may pay less than the first user 510 for a low tier service, and therefore be assigned a lower priority.

For example, prioritizing based on XR user skill level can occur in which a more experienced XR user might be able to be more flexible in working around space limitations, while a novice XR user might be unable to cope with more constraints and may give up more easily and in the interest of keeping the novice user immersed, the novice user may get priority.

In another example, prioritizing based on user age can occur in which young children might have shorter attention spans and/or stronger expectations of consistency, and may be less able to cope with unexpected delays or changes. Therefore the young children may get priority.

In another example, an overall shorter expected XR experience can get priority in which one XR experience is expected to take 5 minutes, while another XR experience is expected to run for several hours and the 5-minute XR experience might get priority as it will have less overall impact.

In the example of FIG. 5, the prioritization data 515 indicates that the first user 501 has a high priority, and that the second user 502 has a low priority. The deconfliction engine 508 evaluates the detected conflict 507 using the prioritization data 515 and determines to prioritize 509 the first 3D space.

The 3D space allocator 512 allocates space within the arena based on the deconfliction. The 3D space allocator 512 can adjust one or more 3D spaces to accommodate other 3D spaces. In the example of FIG. 5, based on prioritizing 509 the first 3D space, the 3D space allocator 512 approves 522 the first requested 3D space. Thus, the allocated first 3D space is the same as the requested first 3D space 501. Based on prioritizing 509 the first 3D space, the 3D space allocator 512 modifies the second 3D space. Thus, the allocated second 3D space is a modified second 3D space 503, which is different from the requested second 3D space 502.

The 3D space allocator 512 provides the allocated 3D spaces to the first XR device 540 and to the second XR device 541. For example, the 3D space allocator 512 notifies the first XR device 540 that the first requested 3D space is approved 522. The XR device 540 can then present the planned XR experience to the first user 510.

The 3D space allocator 512 notifies the second XR device 541 that the second requested 3D space is modified 524. The XR device 541 then modifies the XR experience as needed to present the XR experience to the second user 511 while confining the first user 510 to the modified second 3D space 503.

In an example scenario, a first player participating in an XR experience is walking down a hallway in a first game. The first player's XR device has reserved a long, narrow space for this task. A second player is participating in an XR experience that is constrained at the edges of the first player's reserved space. The second player's XR experience requires passing through the narrow space reserved by the first player.

The second player's XR device submits a request to the system 520 for the second player to pass through the first player's reserved space. In response to receiving the request from the second player's XR device, the system 520 can determine to approve the request, approve the request with conditions, or deny the request. For example, the system 520 can determine to approve the request and permit the second player to cross through the first player's reserved space at the time requested. In another example, the system 520 can determine to approve the request but with a delay, such that the second player is not permitted to cross the first player's reserved space until the first player has passed a particular location within the space. In another example, the system 520 can determine to deny the request, causing the second player's XR device will adjust the second player's XR experience to avoid interfering with the first player's reserved space.

In some examples, the system 520 can manage a credit system of multiple users. For example, each user and/or each XR device can be assigned a number of credits that can be used to trade space within the arena 505. For example, the first XR device 540 can spend credits to take priority over the XR device 541. When the first XR device 540 takes priority over the second XR device 541, the first XR device 540 relinquishes credits and the second XR device 541 gains credits. The second XR device 541 can use the gained credits to take priority over the first XR device 540 the next time that a conflict exists between the first XR device 540 and the second XR device 541.

In some examples, the deconfliction engine 508 can prioritize the XR devices based on the number of credits assigned to each XR device. For example, the prioritization data 515 can include the number of credits assigned to each XR device. When the first XR device 540 has more credits than the second XR device 541, the deconfliction engine 508 can prioritize the first XR device 540 over the second XR device 541. When the 3D space allocator 512 modifies the second 3D space to accommodate the first 3D space, the 3D space allocator 512 can provide an updated prioritization 518 to the database of prioritization data 515. The updated prioritization 518 can include removal of credits from the first XR device 540, and addition of credits to the second XR device 541.

In an example scenario, a first player may have his XR experience adjusted in order to accommodate a second player. For example, the first player's experience may be paused, or the first player's XR application may relinquish some space to the second player's XR application. The first player receives credit for adjusting to accommodate the second player. The next time there is a conflict between the first player and the second player, the first player's XR application can use the received credits to take priority over the second player. In this way, the system 520 can balance conflicts between multiple XR users using a market system.

In some implementations, the 3D space allocator 512 can allocate 3D spaces in a way that causes the least overall impact to the user experiences. For example, the 3D space allocator 512 can use an optimization algorithm to optimize space within the arena 505 based on the constraints of the XR applications running on the XR devices in the arena 505. In some examples, the 3D space allocator 512 can allocate 3D spaces in a way that impacts the fewest number of users.

In certain circumstances, a cancelled reservation or other 3D space constraints might not actually impact the user experience, depending on the XR application. For example, a user might not be ready to move to a second 3D space reservation if they are still completing tasks in a first 3D space. Postponing their reservation for the second 3D space would have no effect on the user's experience. Therefore, the system may reward XR applications that proactively cancel their own reservations when not needed, or penalize XR applications that miss their reservations, e.g., when the user does not enter the reserved 3D space within an allotted amount of time after the beginning of the reservation.

In some examples, the XR applications can provide, to the system 520, the current user location and projected user movements and locations at various times. The system 520 may ask XR applications to relinquish reserved space that does not appear to be used. Requests to reclaim reserved space may be accompanied by offers of rewards such as future priority in reservations, making it advantageous for an XR application to proactively release unused space.

Figure 6:
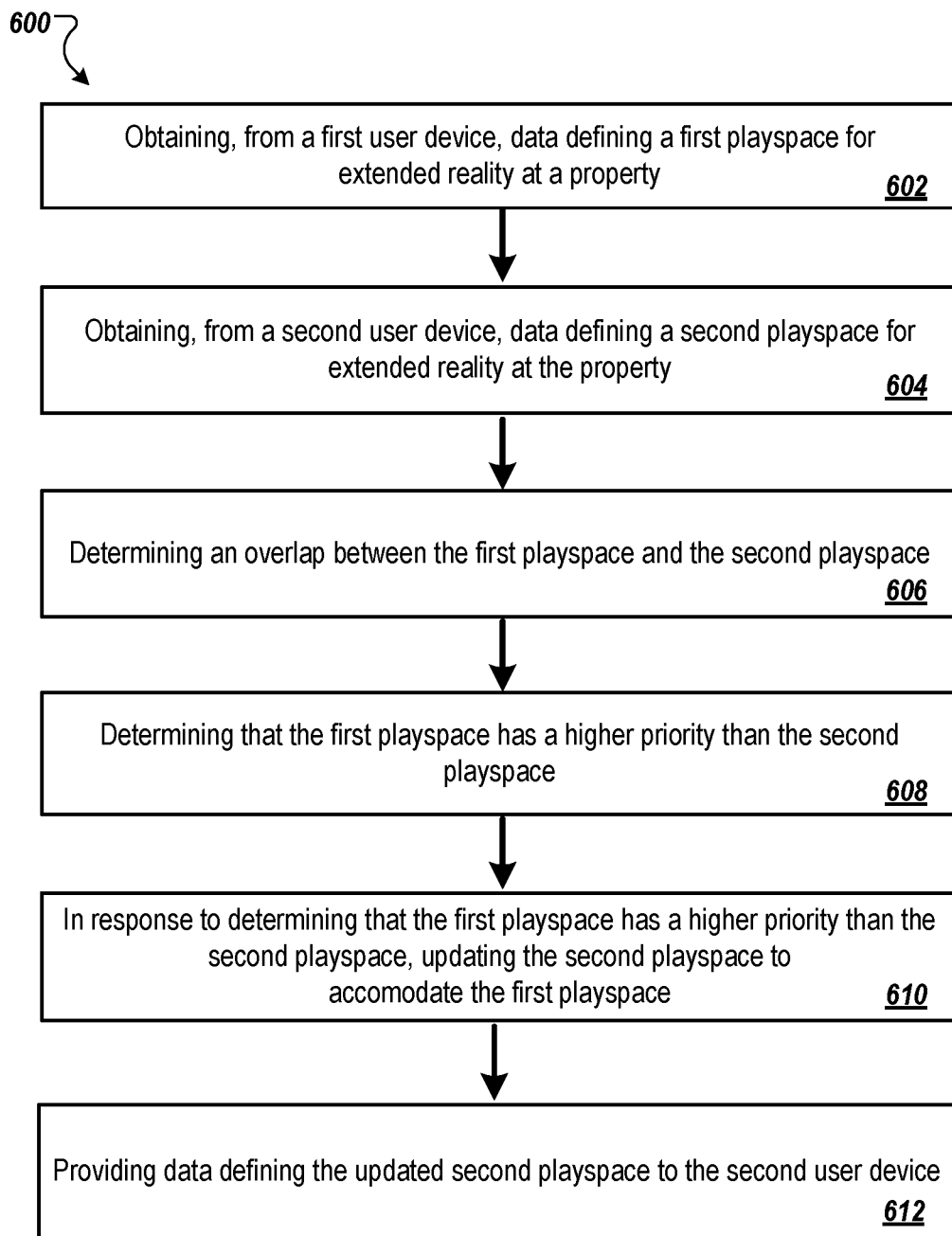
FIG. 6 is a flow diagram of a process for coordination of multiple XR 3D spaces.

FIG. 6 is a flow diagram of a process 600 for coordination of multiple XR 3D spaces. The process 600 will be described as being performed by one or more computing devices, for example, the system 520 or the XR device 540.

The process 600 includes obtaining, from a first user device, data defining a first 3D space for XR at a property (602). For example, the system 520 can obtain, from the first XR device 540, data defining the requested first 3D space 501 in the arena 505.

The process 600 includes obtaining, from a second user device, data defining a second 3D space for XR at the property (604). For example, the system 520 can obtain, from the second XR device 541, data defining the requested second 3D space 502 in the arena 505.

The process 600 includes determining an overlap between the first 3D space and the second 3D space (606). For example, the system 520 determines an overlap in time and space between the requested first 3D space 501 and the requested second 3D space 502.

The process 600 includes determining that the first 3D space has a higher priority than the second 3D space (608). For example, the system 520 determines that the requested first 3D space 501 has a higher priority than the requested second 3D space 502.

The process 600 includes, based on determining that the first 3D space has a higher priority than the second 3D space, updating the second 3D space to accommodate the first 3D space (610). For example, based on determining that the requested first 3D space 501 has a higher priority than the second requested 3D space 502, the system 520 updates the requested second 3D space 502 to accommodate the requested first 3D space 501 by generating the modified second 3D space 503.

The process 600 includes providing data defining the updated second 3D space to the second user device (612). For example, the system 520 provides the approval 522 of the first requested 3D space to the first XR device 540, and provides the modification 524 of the second requested 3D space to the second XR device 541, defining the modified second 3D space 503.

Figure 7:
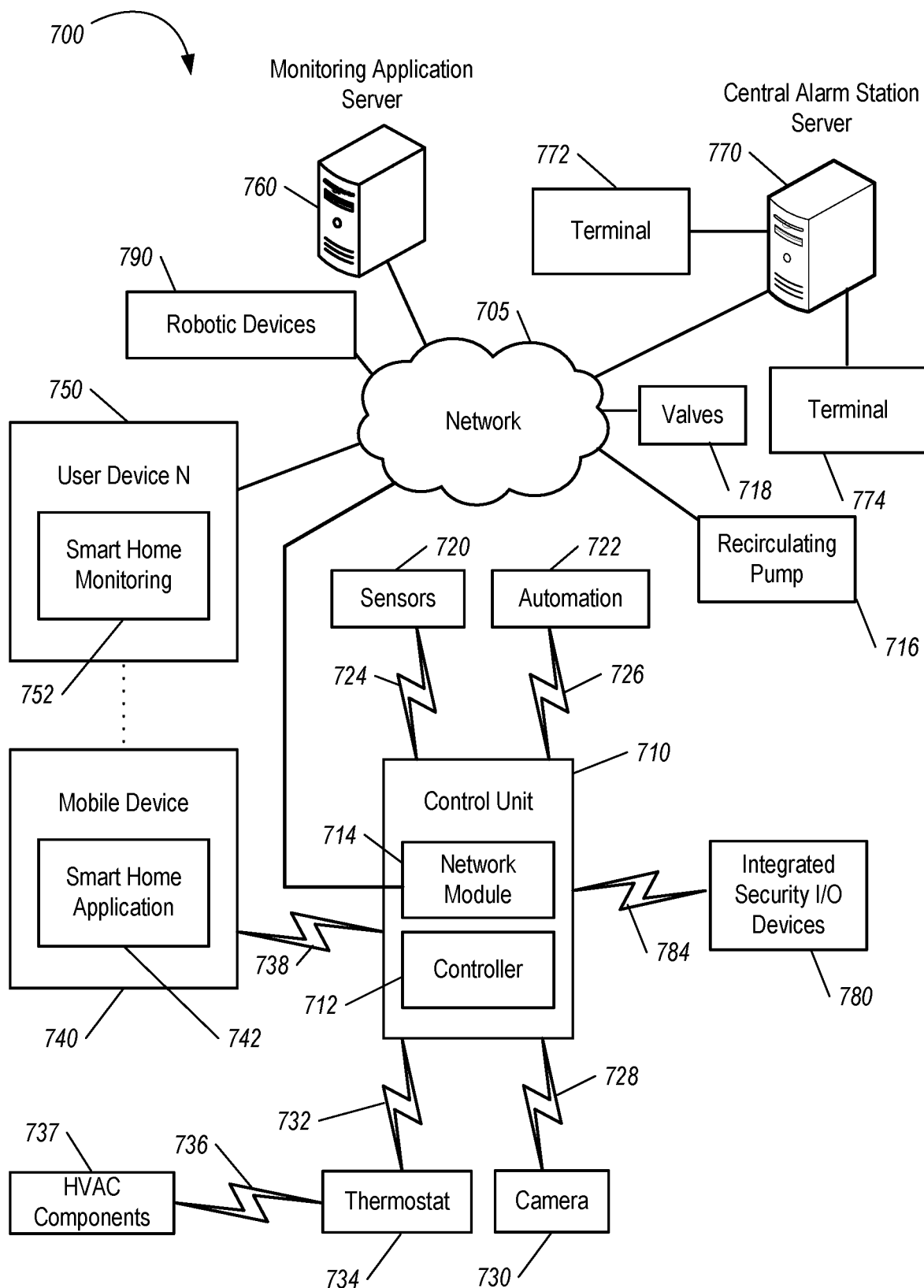
FIG. 7 is a diagram illustrating an example of a property monitoring system.

FIG. 7 is a diagram illustrating an example of a property monitoring system 700. The monitoring system 700 includes a network 705, a control unit 710, one or more user devices 740 and 750, a monitoring server 760, and a central alarm station server 770. In some examples, the network 705 facilitates communications between the control unit 710, the one or more user devices 740 and 750, the monitoring server 760, and the central alarm station server 770.

The network 705 is configured to enable exchange of electronic communications between devices connected to the network 705. For example, the network 705 may be configured to enable exchange of electronic communications between the control unit 710, the one or more user devices 740 and 750, the monitoring server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, flow meters, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voice band modem configured to enable the alarm panel to communicate over the telephone lines of Plain Old Telephone Systems (POTS).

The control unit system that includes the control unit 710 includes one or more sensors. For example, the monitoring system may include multiple sensors 720. The sensors 720 may include a lock sensor, a contact sensor, a motion sensor, or any other type of sensor included in a control unit system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 720 can also include a radio-frequency identification (RFID) sensor that identifies a particular article that includes a pre-assigned RFID tag.

The control unit 710 communicates with the home automation controls 722 and a camera 730 to perform monitoring. The home automation controls 722 are connected to one or more devices that enable automation of actions in the home. For instance, the home automation controls 722 may be connected to one or more lighting systems and may be configured to control operation of the one or more lighting systems. In addition, the home automation controls 722 may be connected to one or more electronic locks at the home and may be configured to control operation of the one or more electronic locks (e.g., control Z-Wave locks using wireless communications in the Z-Wave protocol). Further, the home automation controls 722 may be connected to one or more appliances at the home and may be configured to control operation of the one or more appliances. The home automation controls 722 may include multiple modules that are each specific to the type of device being controlled in an automated manner. The home automation controls 722 may control the one or more devices based on commands received from the control unit 710. For instance, the home automation controls 722 may cause a lighting system to illuminate an area to provide a better image of the area when captured by a camera 730.

The camera 730 may be a video/photographic camera or other type of optical sensing device configured to capture images. For instance, the camera 730 may be configured to capture images of an area within a building or home monitored by the control unit 710. The camera 730 may be configured to capture single, static images of the area and also video images of the area in which multiple images of the area are captured at a relatively high frequency (e.g., thirty images per second). The camera 730 may be controlled based on commands received from the control unit 710.

The camera 730 may be triggered by several different types of techniques. For instance, a Passive Infra-Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensors 720, PIR, door/window, etc.) detect motion or other events. In some implementations, the camera 730 receives a command to capture an image when external devices detect motion or another potential alarm event. The camera 730 may receive the command from the controller 712 or directly from one of the sensors 720.

In some examples, the camera 730 triggers integrated or external illuminators (e.g., Infra-Red, Z-wave controlled "white" lights, lights controlled by the home automation controls 722, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring server 760 over the Internet. In these implementations, image data captured by the camera 730 does not pass through the control unit 710 and the camera 730 receives commands related to operation from the monitoring server 760.

The system 700 also includes thermostat 734 to perform dynamic environmental control at the home. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a home and/or environmental data at a home, e.g., at various locations indoors and outdoors at the home. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the control unit 710 and can control the environmental (e.g., temperature) settings based on commands received from the control unit 710.

In some implementations, the thermostat 734 is a dynamically programmable thermostat and can be integrated with the control unit 710. For example, the dynamically programmable thermostat 734 can include the control unit 710, e.g., as an internal component to the dynamically programmable thermostat 734. In addition, the control unit 710 can be a gateway device that communicates with the dynamically programmable thermostat 734. In some implementations, the thermostat 734 is controlled via one or more home automation controls 722.

A module 737 is connected to one or more components of an HVAC system associated with a home, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

In some examples, the system 700 further includes one or more robotic devices 790. The robotic devices 790 may be any type of robots that are capable of moving and taking actions that assist in home monitoring. For example, the robotic devices 790 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 790 may be devices that are intended for other purposes and merely associated with the system 700 for use in appropriate circumstances. For instance, a robotic vacuum cleaner device may be associated with the monitoring system 700 as one of the robotic devices 790 and may be controlled to take action responsive to monitoring system events.

In some examples, the robotic devices 790 automatically navigate within a home. In these examples, the robotic devices 790 include sensors and control processors that guide movement of the robotic devices 790 within the home. For instance, the robotic devices 790 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 790 may include control processors that process output from the various sensors and control the robotic devices 790 to move along a path that reaches the desired destination and avoids obstacles. In this regard, the control processors detect walls or other obstacles in the home and guide movement of the robotic devices 790 in a manner that avoids the walls and other obstacles.

In addition, the robotic devices 790 may store data that describes attributes of the home. For instance, the robotic devices 790 may store a floorplan and/or a three-dimensional model of the home that enables the robotic devices 790 to navigate the home. During initial configuration, the robotic devices 790 may receive the data describing attributes of the home, determine a frame of reference to the data (e.g., a home or reference location in the home), and navigate the home based on the frame of reference and the data describing attributes of the home. Further, initial configuration of the robotic devices 790 also may include learning of one or more navigation patterns in which a user provides input to control the robotic devices 790 to perform a specific navigation action (e.g., fly to an upstairs bedroom and spin around while capturing video and then return to a home charging base). In this regard, the robotic devices 790 may learn and store the navigation patterns such that the robotic devices 790 may automatically repeat the specific navigation actions upon a later request.

In some examples, the robotic devices 790 may include data capture and recording devices. In these examples, the robotic devices 790 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 790 to take and store a biometric sample that can be used to identify the person (e.g., a biometric sample with DNA that can be used for DNA testing).

In some implementations, the robotic devices 790 may include output devices. In these implementations, the robotic devices 790 may include one or more displays, one or more speakers, and/or any type of output devices that allow the robotic devices 790 to communicate information to a nearby user.

The robotic devices 790 also may include a communication module that enables the robotic devices 790 to communicate with the control unit 710, each other, and/or other devices. The communication module may be a wireless communication module that allows the robotic devices 790 to communicate wirelessly. For instance, the communication module may be a Wi-Fi module that enables the robotic devices 790 to communicate over a local wireless network at the home. The communication module further may be a 900 MHz wireless communication module that enables the robotic devices 790 to communicate directly with the control unit 710. Other types of short-range wireless communication protocols, such as Bluetooth, Bluetooth LE, Z-wave, Zigbee, etc., may be used to allow the robotic devices 790 to communicate with other devices in the home. In some implementations, the robotic devices 790 may communicate with each other or with other devices of the system 700 through the network 705.

The robotic devices 790 further may include processor and storage capabilities. The robotic devices 790 may include any suitable processing devices that enable the robotic devices 790 to operate applications and perform the actions described throughout this disclosure. In addition, the robotic devices 790 may include solid-state electronic storage that enables the robotic devices 790 to store applications, configuration data, collected sensor data, and/or any other type of information available to the robotic devices 790.

The robotic devices 790 are associated with one or more charging stations. The charging stations may be located at predefined home base or reference locations in the home. The robotic devices 790 may be configured to navigate to the charging stations after completion of tasks needed to be performed for the monitoring system 700. For instance, after completion of a monitoring operation or upon instruction by the control unit 710, the robotic devices 790 may be configured to automatically fly to and land on one of the charging stations. In this regard, the robotic devices 790 may automatically maintain a fully charged battery in a state in which the robotic devices 790 are ready for use by the monitoring system 700.

The charging stations may be contact based charging stations and/or wireless charging stations. For contact based charging stations, the robotic devices 790 may have readily accessible points of contact that the robotic devices 790 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 790 may charge through a wireless exchange of power. In these cases, the robotic devices 790 need only locate themselves closely enough to the wireless charging stations for the wireless exchange of power to occur. In this regard, the positioning needed to land at a predefined home base or reference location in the home may be less precise than with a contact based charging station. Based on the robotic devices 790 landing at a wireless charging station, the wireless charging station outputs a wireless signal that the robotic devices 790 receive and convert to a power signal that charges a battery maintained on the robotic devices 790.

In some implementations, each of the robotic devices 790 has a corresponding and assigned charging station such that the number of robotic devices 790 equals the number of charging stations. In these implementations, the robotic devices 790 always navigate to the specific charging station assigned to that robotic device. For instance, a first robotic device may always use a first charging station and a second robotic device may always use a second charging station.

In some examples, the robotic devices 790 may share charging stations. For instance, the robotic devices 790 may use one or more community charging stations that are capable of charging multiple robotic devices 790. The community charging station may be configured to charge multiple robotic devices 790 in parallel. The community charging station may be configured to charge multiple robotic devices 790 in serial such that the multiple robotic devices 790 take turns charging and, when fully charged, return to a predefined home base or reference location in the home that is not associated with a charger. The number of community charging stations may be less than the number of robotic devices 790.

In addition, the charging stations may not be assigned to specific robotic devices 790 and may be capable of charging any of the robotic devices 790. In this regard, the robotic devices 790 may use any suitable, unoccupied charging station when not in use. For instance, when one of the robotic devices 790 has completed an operation or is in need of battery charge, the control unit 710 references a stored table of the occupancy status of each charging station and instructs the robotic device to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices 780. Additionally, the one or more control units 710 may receive one or more sensor data from the sensors 720 and determine whether to provide an alert to the one or more integrated security input/output devices 780.

The sensors 720, the home automation controls 722, the camera 730, the thermostat 734, and the integrated security devices 780 may communicate with the controller 712 over communication links 724, 726, 728, 732, 738, and 784. The communication links 724, 726, 728, 732, 738, and 784 may be a wired or wireless data pathway configured to transmit signals from the sensors 720, the home automation controls 722, the camera 730, the thermostat 734, and the integrated security devices 780 to the controller 712. The sensors 720, the home automation controls 722, the camera 730, the thermostat 734, and the integrated security devices 780 may continuously transmit sensed values to the controller 712, periodically transmit sensed values to the controller 712, or transmit sensed values to the controller 712 in response to a change in a sensed value.

The communication links 724, 726, 728, 732, 738, and 784 may include a local network. The sensors 720, the home automation controls 722, the camera 730, the thermostat 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 760 is an electronic device configured to provide monitoring services by exchanging electronic communications with the control unit 710, the one or more user devices 740 and 750, and the central alarm station server 770 over the network 705. For example, the monitoring server 760 may be configured to monitor events generated by the control unit 710. In this example, the monitoring server 760 may exchange electronic communications with the network module 714 included in the control unit 710 to receive information regarding events detected by the control unit 710. The monitoring server 760 also may receive information regarding events from the one or more user devices 740 and 750.

In some examples, the monitoring server 760 may route alert data received from the network module 714 or the one or more user devices 740 and 750 to the central alarm station server 770. For example, the monitoring server 760 may transmit the alert data to the central alarm station server 770 over the network 705.

The monitoring server 760 may store sensor and image data received from the monitoring system and perform analysis of sensor and image data received from the monitoring system. Based on the analysis, the monitoring server 760 may communicate with and control aspects of the control unit 710 or the one or more user devices 740 and 750.

The monitoring server 760 may provide various monitoring services to the system 700. For example, the monitoring server 760 may analyze the sensor, image, and other data to determine an activity pattern of a resident of the home monitored by the system 700. In some implementations, the monitoring server 760 may analyze the data for alarm conditions or may determine and perform actions at the home by issuing commands to one or more of the controls 722, possibly through the control unit 710.

The monitoring server 760 can be configured to provide information (e.g., activity patterns) related to one or more residents of the home monitored by the system 700 (e.g., user 108). For example, one or more of the sensors 720, the home automation controls 722, the camera 730, the thermostat 734, and the integrated security devices 780 can collect data related to a resident including location information (e.g., if the resident is home or is not home) and provide location information to the thermostat 734.

The central alarm station server 770 is an electronic device configured to provide alarm monitoring service by exchanging communications with the control unit 710, the one or more user devices 740 and 750, and the monitoring server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more user devices 740 and 750 and/or the monitoring server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more authorized user devices 740 and 750 are devices that host and display user interfaces. For instance, the user device 740 is a mobile device that hosts or runs one or more native applications (e.g., the home monitoring application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a home monitoring application 752. The home monitoring application 742 refers to a software/firmware program running on the corresponding mobile device that enables the user interface and features described throughout. The user device 740 may load or install the home monitoring application 742 based on data received over a network or data received from local media. The home monitoring application 742 runs on mobile devices platforms, such as iPhone, iPod touch, Blackberry, Google Android, Windows Mobile, etc. The home monitoring application 742 enables the user device 740 to receive and process image and sensor data from the monitoring system.

The user device 740 may be a general-purpose computer (e.g., a desktop personal computer, a workstation, or a laptop computer) that is configured to communicate with the monitoring server 760 and/or the control unit 710 over the network 705. The user device 740 may be configured to display a smart home user interface 752 that is generated by the user device 740 or generated by the monitoring server 760. For example, the user device 740 may be configured to display a user interface (e.g., a web page) provided by the monitoring server 760 that enables a user to perceive images captured by the camera 730 and/or reports related to the monitoring system. Although FIG. 7 illustrates two user devices for brevity, actual implementations may include more (and, perhaps, many more) or fewer user devices.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Z-wave, Zigbee, HomePlug (ethernet over power line), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring server 760) may be significantly slower.

Although the one or more user devices 740 and 750 are shown as communicating with the control unit 710, the one or more user devices 740 and 750 may communicate directly with the sensors and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring server 760 may relay data received from the control unit 710 to the one or more user devices 740 and 750 through the network 705. In this regard, the monitoring server 760 may facilitate communication between the one or more user devices 740 and 750 and the monitoring system.

In some implementations, the one or more user devices 740 and 750 may be configured to switch whether the one or more user devices 740 and 750 communicate with the control unit 710 directly (e.g., through link 738) or through the monitoring server 760 (e.g., through network 705) based on a location of the one or more user devices 740 and 750. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 includes the one or more user devices 740 and 750, the sensors 720, the home automation controls 722, the camera 730, and the robotic devices 790. The one or more user devices 740 and 750 receive data directly from the sensors 720, the home automation controls 722, the camera 730, and the robotic devices 790, and sends data directly to the sensors 720, the home automation controls 722, the camera 730, and the robotic devices 790. The one or more user devices 740, 750 provide the appropriate interfaces/processing to provide visual surveillance and reporting.

In other implementations, the system 700 further includes network 705 and the sensors 720, the home automation controls 722, the camera 730, the thermostat 734, and the robotic devices 790, and are configured to communicate sensor and image data to the one or more user devices 740 and 750 over network 705 (e.g., the Internet, cellular network, etc.). In yet another implementation, the sensors 720, the home automation controls 722, the camera 730, the thermostat 734, and the robotic devices 790 (or a component, such as a bridge/router) are intelligent enough to change the communication pathway from a direct local pathway when the one or more user devices 740 and 750 are in close physical proximity to the sensors 720, the home automation controls 722, the camera 730, the thermostat 734, and the robotic devices 790 to a pathway over network 705 when the one or more user devices 740 and 750 are farther from the sensors 720, the home automation controls 722, the camera 730, the thermostat 734, and the robotic devices 790.

In some examples, the system leverages GPS information from the one or more user devices 740 and 750 to determine whether the one or more user devices 740 and 750 are close enough to the sensors 720, the home automation controls 722, the camera 730, the thermostat 734, and the robotic devices 790 to use the direct local pathway or whether the one or more user devices 740 and 750 are far enough from the sensors 720, the home automation controls 722, the camera 730, the thermostat 734, and the robotic devices 790 that the pathway over network 705 is required.

In other examples, the system leverages status communications (e.g., pinging) between the one or more user devices 740 and 750 and the sensors 720, the home automation controls 722, the camera 730, the thermostat 734, and the robotic devices 790 to determine whether communication using the direct local pathway is possible. If communication using the direct local pathway is possible, the one or more user devices 740 and 750 communicate with the sensors 720, the home automation controls 722, the camera 730, the thermostat 734, and the robotic devices 790 using the direct local pathway. If communication using the direct local pathway is not possible, the one or more user devices 740 and 750 communicate with the sensors 720, the home automation controls 722, the camera 730, the thermostat 734, and the robotic devices 790 using the pathway over network 705.

In some implementations, the system 700 provides end users with access to images captured by the camera 730 to aid in decision making. The system 700 may transmit the images captured by the camera 730 over a wireless WAN network to the user devices 740 and 750. Because transmission over a wireless WAN network may be relatively expensive, the system 700 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 730). In these implementations, the camera 730 may be set to capture images on a periodic basis when the alarm system is armed in an "away" state, but set not to capture images when the alarm system is armed in a "home" state or disarmed. In addition, the camera 730 may be triggered to begin capturing images when the alarm system detects an event, such as an alarm event, a door-opening event for a door that leads to an area within a field of view of the camera 730, or motion in the area within the field of view of the camera 730. In other implementations, the camera 730 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
   selecting, from a plurality of available portions of a physical space at a property and using a physical location of a person and an availability likelihood for each portion from the plurality of available portions, a first available portion of the physical space for representing an extended reality environment that has the highest availability likelihood;
   after selecting the first available portion, causing, using the first available portion of the physical space, presentation i) by an extended reality device and ii) of a first portion of the extended reality environment virtually within the first available portion of the physical space;
   predicting, while the first portion of the extended reality environment is presented virtually within the first available portion of the physical space and using sensor data generated from one or more sensors at the property, that the first available portion of the physical space will likely be interfered with;
   in response to predicting that the first available portion of the physical space will likely be interfered with, selecting, from the plurality of available portions of the physical space and using the physical location of the person and a second availability likelihood for each portion from the plurality of available portions, a second available portion for representing the extended reality environment that has the highest second availability likelihood; and
   after selecting the second available portion, causing, using the second available portion of the physical space, presentation i) by the extended reality device and ii) of a second portion of the extended reality environment virtually within the second available portion of the physical space.

2. The method of claim 1, wherein the physical space comprises a three-dimensional space available for use for the extended reality environment.

3. The method of claim 1, comprising:
   determining, for at least one physical portion of the physical space, whether the respective physical portion is likely occupied; and
   using, as the plurality of available portions of the physical space, one or more of the physical portions of the physical space that is not likely occupied.

4. The method of claim 1, comprising:
   determining, for at least one physical portion of the physical space, a status of a device physically located within a threshold distance of the respective physical portion; and
   selecting, using the status of at least the device physically located within the threshold distance of the respective physical portion, one or more of the physical portions of the physical space as the plurality of available portions of the physical space.

5. The method of claim 1, comprising:
   for each of one or more physical portions of the physical space:
      determining a likelihood that the respective physical portion will be interfered with during an expected duration for an extended reality environment session; and
      determining whether the likelihood satisfies a likelihood threshold; and
   using, as the plurality of available portions of the physical space, the physical portions of the physical space that have a corresponding likelihood that satisfies the likelihood threshold.

6. The method of claim 1, wherein predicting that the first available portion of the physical space will likely be interfered with comprises predicting, using the sensor data generated from one or more sensors at the property, that an object will likely enter the first available portion of the physical space.

7. The method of claim 1, wherein predicting that the first available portion of the physical space will likely be interfered with comprises predicting, using a current time at the property, the first available portion of the physical space will likely be interfered with.

8. The method of claim 1, wherein the second available portion is a proper subset of an area included in the first available portion.

9. The method of claim 1, wherein causing presentation of the portion of the extended reality environment at the first available portion or the second available portion of the physical space comprises sending, to a device that generates the extended reality environment, a command to cause the device to present the portion of the extended reality environment at the first available portion or the second available portion of the physical space.

10. The method of claim 1 wherein each of the plurality of available portions comprises a fixed portion of the physical space.

11. A system comprising one or more computers and one or more storage devices on which are stored instructions that are operable, when executed by the one or more computers, to cause the one or more computers to perform operations comprising:
   selecting, from a plurality of available portions of a physical space at a property and using a physical location of a person and an availability likelihood for each portion from the plurality of available portions, a first available portion of the physical space for representing an extended reality environment that has the highest availability likelihood;
   after selecting the first available portion, causing, using the first available portion of the physical space, presentation i) by an extended reality device and ii) of a first portion of the extended reality environment virtually within the first available portion of the physical space;
   predicting, while the first portion of the extended reality environment is presented virtually within the first available portion of the physical space and using sensor data generated from one or more sensors at the property, that the first available portion of the physical space will likely be interfered with;
   in response to predicting that the first available portion of the physical space will likely be interfered with, selecting, from the plurality of available portions of the physical space and using the physical location of the person and a second availability likelihood for each portion from the plurality of available portions, a second available portion for representing the extended reality environment that has the highest second availability likelihood; and
   after selecting the second available portion, causing, using the second available portion of the physical space, presentation i) by the extended reality device and ii) of a second portion of the extended reality environment virtually within the second available portion of the physical space.

12. The system of claim 11, wherein the physical space comprises a three-dimensional space available for use for the extended reality environment.

13. The system of claim 11, comprising:
determining, for at least one physical portion of the physical space, whether the respective physical portion is likely occupied; and
using, as the plurality of available portions of the physical space, one or more of the physical portions of the physical space that is not likely occupied.

14. The system of claim 10 claim 11, comprising:
determining, for at least one physical portion of the physical space, a status of a device physically located within a threshold distance of the respective physical portion; and
selecting, using the status of at least the device physically located within the threshold distance of the respective physical portion, one or more of the physical portions of the physical space as the plurality of available portions of the physical space.

15. The system of claim 10 claim 11, comprising:
for each of one or more physical portions of the physical space:
determining a likelihood that the respective physical portion will be interfered with during an expected duration for an extended reality environment session; and
determining whether the likelihood satisfies a likelihood threshold; and
using, as the plurality of available portions of the physical space, the physical portions of the physical space that have a corresponding likelihood that satisfies the likelihood threshold.

16. The system of claim 10 claim 11, wherein predicting that the first available portion of the physical space will likely be interfered with comprises predicting, using the sensor data generated from one or more sensors at the property, that an object will likely enter the first available portion of the physical space.

17. The system of claim 11, wherein predicting that the first available portion of the physical space will likely be interfered with comprises predicting, using a current time at the property, the first available portion of the physical space will likely be interfered with.

18. The system of claim 11, wherein the second available portion is a proper subset of an area included in the first available portion.

19. One or more non-transitory computer storage media medium encoded with instructions that, when executed by one or more computers, cause the one or more computers to perform operations comprising:

selecting, from a plurality of available portions of a physical space at a property and using a physical location of a person and an availability likelihood for each portion from the plurality of available portions, a first available portion of the physical space for representing an extended reality environment that has the highest availability likelihood;

after selecting the first available portion, causing, using the first available portion of the physical space, presentation i) by an extended reality device and ii) of a first portion of the extended reality environment virtually within the first available portion of the physical space;

predicting, while the first portion of the extended reality environment is presented virtually within the first available portion of the physical space and using sensor data generated from one or more sensors at the property, that the first available portion of the physical space will likely be interfered with;

in response to predicting that the first available portion of the physical space will likely be interfered with, selecting, from the plurality of available portions of the physical space and using the physical location of the person and a second availability likelihood for each portion from the plurality of available portions, a second available portion for representing the extended reality environment that has the highest second availability likelihood; and after selecting the second available portion, causing, using the second available portion of the physical space, presentation i) by the extended reality device and ii) of a second portion of the extended reality environment virtually within the second available portion of the physical space.

20. The one or more non-transitory computer storage media medium of claim 19, comprising:
determining, for at least one physical portion of the physical space, whether the respective physical portion is likely occupied; and
using, as the plurality of available portions of the physical space, one or more of the physical portions of the physical space that is not likely occupied.

* * * * *